(12) United States Patent
Jung et al.

(10) Patent No.: US 9,026,940 B2
(45) Date of Patent: May 5, 2015

(54) MOBILE TERMINAL AND METHOD OF MANAGING OBJECT RELATED INFORMATION THEREIN

(75) Inventors: Sungho Jung, Yongin-si (KR); Jieun Lee, Gwangmyeong-si (KR)

(73) Assignee: LG Electronics Inc., Seoul (KR)

( * ) Notice: Subject to any disclaimer, the term of this patent is extended or adjusted under 35 U.S.C. 154(b) by 402 days.

(21) Appl. No.: 13/110,854

(22) Filed: May 18, 2011

(65) Prior Publication Data

US 2012/0096403 A1 Apr. 19, 2012

(30) Foreign Application Priority Data

Oct. 18, 2010 (KR) .......................... 10-2010-0101489

(51) Int. Cl.
*G06F 3/048* (2013.01)
*H04M 1/725* (2006.01)
(Continued)

(52) U.S. Cl.
CPC ....... *H04M 1/72572* (2013.01); *G01C 21/3617* (2013.01); *G01C 21/3614* (2013.01); *G06F 3/0482* (2013.01); *G01C 21/3679* (2013.01); *G01C 21/36* (2013.01);
(Continued)

(58) Field of Classification Search
CPC . G06F 3/0482; G06F 3/0486; G06F 3/04883; G01C 21/36; G01C 21/3611; G01C 21/3614; G01C 21/3617; G01C 21/3679
USPC .......... 715/817, 810, 854, 855, 968; 701/425, 701/426, 436, 438; 345/632, 633; 707/724, 707/754
See application file for complete search history.

(56) References Cited

U.S. PATENT DOCUMENTS

| 8,301,202 | B2 * | 10/2012 | Lee ................................ 455/566 |
| 2004/0046779 | A1 * | 3/2004 | Asano et al. ................... 345/716 |

(Continued)

FOREIGN PATENT DOCUMENTS

| CN | 1413424 | 4/2003 |
| CN | 101379369 | 3/2009 |

(Continued)

OTHER PUBLICATIONS

Hans Gellersen, et al., "Supporting device discovery and spontaneous interaction with spatial references", Personal and Ubiquitous Computing, Jul. 2008, pp. 255-264, vol. 13, No. 4.

(Continued)

*Primary Examiner* — Patrick Riegler
(74) *Attorney, Agent, or Firm* — Lee, Hong, Degerman, Kang & Waimey

(57) ABSTRACT

The mobile terminal includes a wireless communication unit configured to receive terminal position information and object related information of at least one object corresponding to the terminal position information; a display module configured to display at least one object indicator indicating the at least one object and display a storage target object indicator region on a background image corresponding to the terminal position information; a user input unit configured to receive a selection of an object indicator; a memory configured to store object related information; and a controller configured to control the components of the mobile terminal. The display module is further configured to display an identifier corresponding to the selected object indicator within the storage target object indicator region, and display an object item list including an object item corresponding to the stored object related information.

14 Claims, 44 Drawing Sheets

(51) Int. Cl.
  *G01C 21/36* (2006.01)
  *G06F 3/0482* (2013.01)
  *G06F 3/0486* (2013.01)
  *G06F 3/0488* (2013.01)

(52) U.S. Cl.
  CPC ......... *G01C 21/3611* (2013.01); *G06F 3/0486* (2013.01); *G06F 3/04883* (2013.01); *H04M 2250/22* (2013.01); *H04M 2250/64* (2013.01); *Y10S 715/968* (2013.01)

(56) References Cited

U.S. PATENT DOCUMENTS

| | | | |
|---|---|---|---|
| 2004/0260464 A1* | 12/2004 | Wong | 701/209 |
| 2005/0165543 A1* | 7/2005 | Yokota | 701/204 |
| 2006/0001757 A1* | 1/2006 | Sawachi | 348/333.12 |
| 2007/0162942 A1* | 7/2007 | Hamynen et al. | 725/105 |
| 2008/0036778 A1* | 2/2008 | Sheha et al. | 345/502 |
| 2008/0040024 A1* | 2/2008 | Silva | 701/200 |
| 2008/0069404 A1* | 3/2008 | Lee et al. | 382/106 |
| 2008/0147730 A1* | 6/2008 | Lee et al. | 707/104.1 |
| 2008/0163073 A1* | 7/2008 | Becker et al. | 715/753 |
| 2008/0195314 A1* | 8/2008 | Green | 701/211 |
| 2008/0291022 A1* | 11/2008 | Amador et al. | 340/572.1 |
| 2009/0098910 A1 | 4/2009 | Roh et al. | |
| 2009/0102859 A1 | 4/2009 | Athsani et al. | |
| 2009/0178007 A1 | 7/2009 | Matas et al. | |
| 2009/0319181 A1 | 12/2009 | Khosravy et al. | |
| 2010/0087207 A1* | 4/2010 | Tsurutome et al. | 455/456.3 |
| 2010/0268451 A1* | 10/2010 | Choi | 701/201 |
| 2010/0280904 A1* | 11/2010 | Ahuja | 705/14.58 |
| 2010/0287485 A1* | 11/2010 | Bertolami et al. | 715/764 |
| 2011/0035143 A1* | 2/2011 | Lee | 701/200 |
| 2011/0055338 A1* | 3/2011 | Loeb et al. | 709/206 |
| 2011/0161875 A1* | 6/2011 | Kankainen | 715/810 |
| 2011/0279445 A1* | 11/2011 | Murphy et al. | 345/419 |
| 2012/0019557 A1* | 1/2012 | Aronsson et al. | 345/633 |
| 2012/0041673 A1* | 2/2012 | Vandivier et al. | 701/426 |
| 2012/0075341 A1* | 3/2012 | Sandberg | 345/633 |
| 2012/0122491 A1* | 5/2012 | Kim et al. | 455/456.3 |
| 2012/0194465 A1* | 8/2012 | Gronow et al. | 345/173 |

FOREIGN PATENT DOCUMENTS

| WO | 2009002942 | 12/2008 | |
|---|---|---|---|
| WO | WO 2011084720 A2 * | 7/2011 | |

OTHER PUBLICATIONS

Perez, "iPhoto 09 Basics," Florida Center for Instructional Technology, Aug. 2009, 14 pages.

European Patent Office Application Serial No. 11003829.6, Office Action dated Nov. 12, 2014, 5 pages.

* cited by examiner

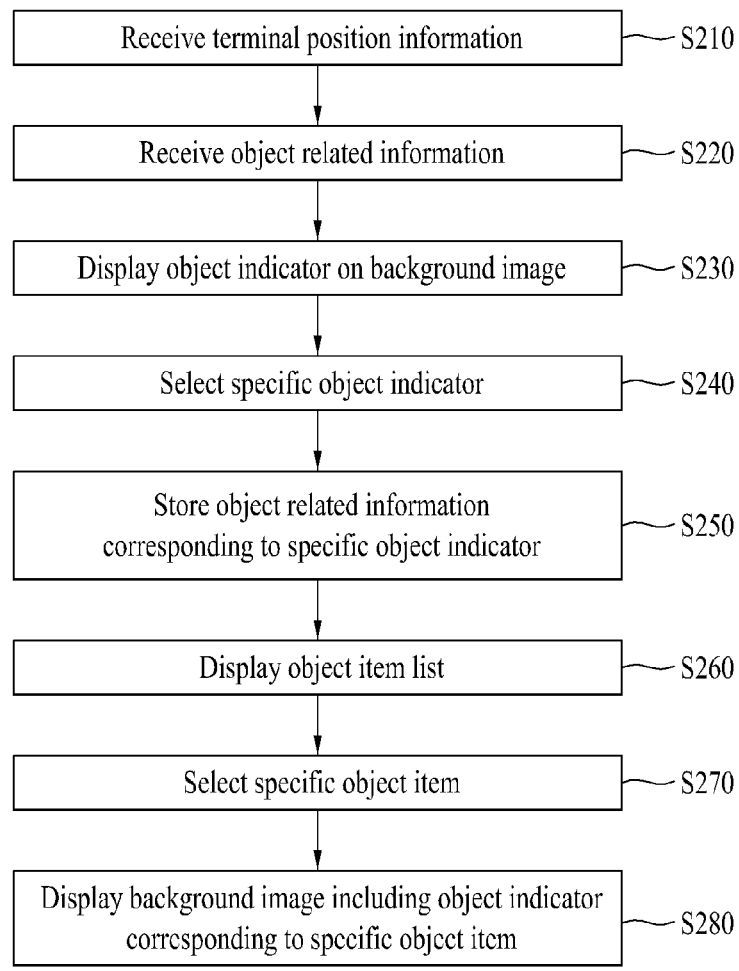

← Incoming (or Receiving)
→ Outgoing (or Transmitting)

MOBILE TERMINAL AND METHOD OF MANAGING OBJECT RELATED INFORMATION THEREIN

CROSS-REFERENCE TO RELATED APPLICATIONS

Pursuant to 35 U.S.C. §119(a), this application claims the benefit of earlier filing date and right of priority to Korean Application No. 10-2010-0101489, filed on Oct. 18, 2010, the contents of which are hereby incorporated by reference herein in their entirety.

BACKGROUND OF THE INVENTION

1. Field of the Invention

The present invention relates to terminals, and more particularly, to mobile terminals.

2. Discussion of the Related Art

Generally, terminals can be classified as mobile terminals and stationary terminals. Furthermore, the mobile terminals can be classified as handheld terminals and vehicle mount terminals according to whether users can carry the terminals on their person.

As functions of terminals are diversified, the terminals are implemented as multimedia players with composite functions, such as capturing photos or moving pictures, playing back music or moving picture files, playing games, and receiving broadcasts. To support and increase in such functions of the terminals, structural and/or software improvements to the terminals are typically needed.

Recently, mobile terminals are being equipped with the ability to download and operate applications employing augmented reality (AR) technology. As AR based applications become increasingly diversified, however, a greater number and variety of services using AR related data are needed to meet the demand by the users of the mobile terminals.

SUMMARY

In accordance with an embodiment, a mobile terminal includes a wireless communication unit configured to receive terminal position information and object related information of at least one object corresponding to the terminal position information; a display module configured to display at least one object indicator indicating the at least one object and display a storage target object indicator region on a background image corresponding to the terminal position information; a user input unit configured to receive a selection of an object indicator of the displayed at least one object indicator; a memory configured to store object related information of the selected object indicator from the received object related information; and a controller configured to control an operation of at least the wireless communication unit, the display module, the user input unit or the memory. The display module is further configured to display an identifier corresponding to the selected object indicator within the storage target object indicator region, and display an object item list that includes an object item corresponding to the stored object related information after storage of the object related information of the selected object indicator is completed.

In accordance with another embodiment, a mobile terminal includes a wireless communication unit configured to receive terminal position information and object related information of at least one object corresponding to the terminal position information; a display module configured to display at least one object indicator indicating the at least one object and display a transmission target object indicator region on a background image corresponding to the terminal position information; a user input unit configured to receive a selection of an object indicator of the displayed at least one object indicator and a selection of at least one counterpart terminal intended to receive object related information of the selected object indicator; and a controller configured to prepare a message including the object related information of the selected object indicator and to transmit the message to the selected at least one counterpart terminal via the wireless communication unit. The display module is further configured to display an identifier corresponding to the selected object indicator within the transmission target object indicator region.

In accordance with another embodiment, a method for managing object related information in a mobile terminal includes receiving, at a wireless communication unit, terminal position information and object related information of at least one object corresponding to the terminal position information; displaying, on a display module, at least one object indicator indicating the at least one object and displaying a storage target object indicator region on a background corresponding to the terminal position information; receiving, at a user input unit, a selection of an object indicator from the displayed at least one object indicator; displaying, on the display module, an identifier corresponding to the selected object indicator within the storage target object indicator region; storing, in a memory, object related information of the object represented by the selected object indicator; and displaying, on the display module, an object item list including an object item corresponding to the stored object related information.

In accordance with another embodiment, a method for managing object related information in a mobile terminal includes receiving, at the mobile terminal, terminal position information and object related information of at least one object corresponding to the terminal position information; displaying at least one object indicator indicating the at least one object; displaying a transmission target object indicator region on a background image corresponding to the terminal position information; receiving a selection of an object indicator of the displayed at least one object indicator; displaying an identifier corresponding to the selected object indicator within the transmission target object indicator region; receiving a selection of at least one counterpart terminal intended to receive object related information of the selected object indicator; preparing a first message for transmission to the selected at least one counterpart terminal, the first message including the object related information of the selected object indicator.

In accordance with another embodiment, a method for managing object related information in a mobile terminal includes separately displaying, on a display module, at least one object icon corresponding to at least one object, and a background image; receiving, at a user input unit, an input for selecting an object icon from the at least one object icon and an input for selecting a specific point on the background image; displaying, on the display module, the selected object icon at the specific point; determining a position point of an object indicated by the selected object icon within the background image; and displaying, on the display module, the selected object icon by moving the selected object icon from the specific point to the determined position point of the object.

BRIEF DESCRIPTION OF THE DRAWINGS

The above and other features and advantages of the present invention will become more apparent by describing in detail preferred embodiments thereof with reference to the attached drawings.

FIG. 2 is a flowchart of a method for managing object related information according to one embodiment of the present invention.

FIGS. 7A through 7C are exemplary display screens of the display module showing an operation of the mobile terminal for displaying an object item list based on priority in accordance with various embodiments of the present invention.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. The terms "module" and "unit" are used interchangeably herein.

The mobile terminal described according to the various embodiments herein can include a mobile phone, a smart phone, a laptop computer, a digital broadcast terminal, a personal digital assistants (PDA), a portable multimedia player (PMP), or a navigation system.

Except in cases applicable to a mobile terminal only, it is apparent to those skilled in the art that the configurations according to the embodiments described herein are applicable to any stationary terminal, such as a digital TV or a desktop computer.

Figure 1:
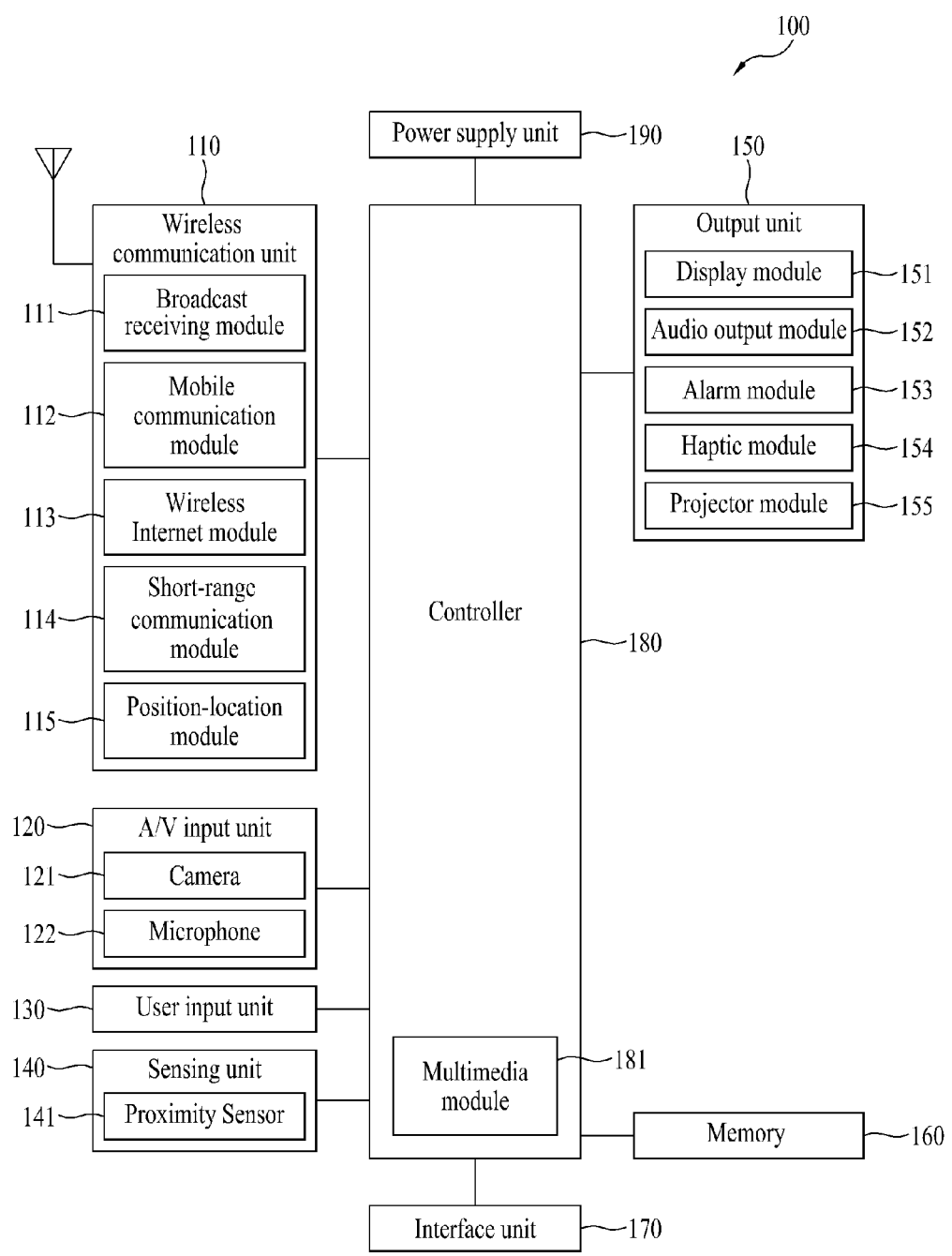
FIG. 1 is a block diagram of a mobile terminal according to one embodiment of the present invention.

FIG. 1 is a block diagram of a mobile terminal 100 according to one embodiment of the present invention.

Referring to FIG. 1, the mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190. It should be understood that the mobile terminal 100 can include additional or fewer components than those shown in FIG. 1.

The wireless communication unit 110 includes one or more components which enable wireless communication between the mobile terminal 100 and a wireless communication system or network in which the mobile terminal 100 is located. For example, the wireless communication unit 110 can include a broadcast receiving module 111, a mobile communication module 112, a wireless Internet module 113, a short-range communication module 114, and a position location module 115.

The broadcast receiving module 111 receives a broadcast signal and/or broadcast related information from an external broadcast managing server via a broadcast channel. The broadcast channel can be a satellite channel or a terrestrial channel.

The broadcast managing server generally can be a server that generates and transmits a broadcast signal and/or broadcast related information, or a server that receives a previously generated broadcast signal and/or previously generated broadcast related information and transmits the previously generated broadcast signal and/or broadcast related information to a terminal.

For example, the broadcast signal can be a television broadcast signal, a radio broadcast signal, or a data broadcast signal. The broadcast signal can further include a broadcast signal combined with a television or radio broadcast signal.

The broadcast related information can include information related to a broadcast channel, a broadcast program, or a broadcast service provider. The broadcast related information can be provided via a mobile communication network. In such a case, the broadcast related information can be received by the mobile communication module 112.

The broadcast related information can take various forms. For example, broadcast related information can be in the form of an electronic program guide (EPG) of the digital multimedia broadcasting (DMB) standard, or an electronic service guide (ESG) of the digital video broadcast-handheld (DVB-H) standard.

The broadcast receiving module 111 can be configured to receive broadcast signals transmitted from various types of broadcast systems, such as digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T) systems. The broadcast receiving module 111 can be configured to be suitable for the previously described digital broadcasting systems, as well as other broadcasting systems.

The broadcast signal and/or broadcast related information received by the broadcast receiving module 111 can be stored in a suitable storage device, such as the memory 160.

The mobile communication module 112 transmits and/or receives wireless signals to and/or from one or more network entities, such as a base station, external terminal, or server. Such wireless signals can include audio, video, and/or various types of data according to text and/or multimedia message transmission and/or reception.

The wireless Internet module 113 supports Internet access for the mobile terminal 100. For example, the wireless Internet module 113 can be internally or externally coupled to the mobile terminal 100. The wireless Internet technology implemented by the wireless Internet module 113 can be a wireless local area network (WLAN), Wi-Fi, Wireless Broadband (WiBro), World Interoperability for Microwave Access (WiMAX), or High-Speed Downlink Packet Access (HSDPA).

The short-range communication module 114 facilitates relatively short range or local area communication. For example, the short-range communication module 114 can be configured to communicate using short range communication technology, such as radio-frequency identification (RFID), Infrared Data Association (IrDA), Ultra-wideband (UWB), as well as networking technologies, such as Bluetooth™ and ZigBee™

The location module 115 can be configured to identify or otherwise obtain the location of the mobile terminal 100. For example, the location module 115 can include a global positioning system (GPS) module (not shown in FIG. 1).

Referring to FIG. 1, the A/V input unit 120 is configured to provide an audio or video signal input to the mobile terminal 100. As shown in FIG. 1, the A/V input unit 120 includes a camera 121 and a microphone 122. The camera 121 receives and processes image frames of still images or video, which are obtained by an image sensor of the camera 121 in a video call mode or a photographing mode. The processed image frames can be displayed on the display module 151.

The image frames processed by the camera 121 can be stored in the memory 160 or transmitted via the wireless communication unit 110. Other embodiments of the mobile terminal 100 can include more than one camera 121.

The microphone 122 can receive an external audio signal while the mobile terminal 100 is in a particular mode, such as phone call mode, recording mode or a voice recognition mode. The external audio signal can be processed and converted into electrical audio data. The electrical audio data can be transformed into a format that can be transmitted to a mobile communication base station via the mobile communication module 112 when the mobile terminal 100 is in a call mode. The microphone 122 can include various types of noise cancelling algorithms for removing any undesirable noise in the received the external audio signal.

The user input unit 130 can generate input data in response to user manipulation of one or more input devices. Examples of such inputs devices include a keypad, a dome switch, a jog wheel, a jog switch, or a touchpad based on static pressure or capacitance.

The sensing unit 140 can provide sensing signals for controlling operations of the mobile terminal 100 by detecting the status or state of the mobile terminal 100. For example, the sensing unit 140 can detect an opened or closed state of the mobile terminal 100, a relative position of the components of the mobile terminal 100, such as a display or keypad, a change of position of the mobile terminal 100 or a component of the mobile terminal 100, a presence or absence of user contact with the mobile terminal 100, the orientation of the mobile terminal 100, or acceleration or deceleration of the mobile terminal 100.

In one embodiment, the mobile terminal 100 can be configured as a slide-type mobile terminal. In such an embodiment, the sensing unit 140 can sense whether a sliding portion of the mobile terminal 100 is opened or closed. The sensing unit 140 can be configured to sense the presence or absence of power provided by the power supply 190, the presence or absence of a coupling or other connection between the interface unit 170 and an external device. As shown in the embodiment of FIG. 1, the sensing unit 140 can include a proximity sensor 141.

The output unit 150 can generate a visual, an auditory, and/or a tactile output. In the embodiment of FIG. 1, the output unit 150 includes the display module 151, an audio output module 152, an alarm module 153, a haptic module 154, and a projector module 155.

The display module 151 can be configured to visually display or output information associated with the mobile terminal 100. For example, if the mobile terminal 100 is operating in a phone call mode, the display module 151 can be configured to provide a user interface (UI) or graphical user interface (GUI) which includes information associated with placing, conducting, and terminating a phone call. As another example, if the mobile terminal 100 is in a video call mode or a photographing mode, the display module 151 can additionally or alternatively display images which are associated with these modes, the UI or the GUI.

The display module 151 can be implemented using known display technologies including, for example, a liquid crystal display (LCD), a thin film transistor-liquid crystal display (TFT-LCD), an organic light-emitting diode (OLED) display, a flexible display or a three-dimensional display. The mobile terminal 100 can include one or more of such displays.

In one embodiment, the display module 151 can be configured as a transparent or optically transmissive type, which is herein referred to as a "transparent display." For example, the transparent display can be a transparent OLED (TOLED) display. In one embodiment, a rear configuration of the display module 151 can also be implemented as an optically transmissive type. In such an embodiment, a user of the mobile terminal 100 can see an object at the rear of the body of the mobile terminal 100 through the area occupied by the display module 151.

The mobile terminal 100 can be configured to include more than one display module 151. For example, the mobile terminal 100 can include a number of display module 151 that are arranged on a single face of the mobile terminal 100 by being spaced apart or integrated in one body. Alternatively, the number of display modules 151 can also be arranged on different faces of the mobile terminal 100.

When the display module 151 and a sensor for detecting a touch input (hereinafter referred to as a "touch sensor") are configured as a layered structure to form a touch screen, the display module 151 can be used as an input device in addition to an output device. For example, the touch sensor can be configured as a touch film, a touch sheet, or a touch pad.

The touch sensor can be configured to convert a pressure applied to a specific portion of the display module 151 or a variation in capacitance generated at a specific portion of the display module 151 into an electric input signal. The touch sensor can detect pressure resulting from a touch, as well as the position and area of the touch.

When the user applies a touch input to the touch sensor, a signal corresponding to the touch input can be transmitted to a touch controller (not shown). The touch controller can process the signal and transmit the processed signal to the controller 180. The controller 180 can then use the processed signal to detect a touched portion of the display module 151.

The proximity sensor 141 of the sensing unit 140 can be located in an internal region of the mobile terminal 100, enclosed by the touch screen, or around the touch screen. The proximity sensor 141 can detect an object approaching a prescribed detecting surface or an object located near the proximity sensor 141 without any physical contact using an electromagnetic field or infrared rays. The longevity of the proximity sensor 141 can substantially exceed the longevity of a contact sensor. Moreover, the proximity sensor 141 can have a wider range of utility than a contact sensor.

The proximity sensor 141 can include a transmission type photo-electric sensor, a direct reflection type photo-electric sensor, a mirror reflection type photo-electric sensor, a radio frequency oscillation proximity sensor, an electrostatic capacity proximity sensor, a magnetic proximity sensor, and/or an infrared proximity sensor. When the touch screen is implemented with an electrostatic capacity proximity sensor in the mobile terminal 100, a proximity of a pointer can be detected using a variation in an electric field according to the proximity of the pointer. Accordingly, the touch screen (touch sensor) can be classified as the proximity sensor 141.

For purposes of clarity, an action of the pointer approaching the touch screen and being recognized without actually contacting the touch screen will also be herein referred to as a "proximity touch," while an action of bringing the pointer into contact with the touch screen will also be herein referred to as a "contact touch." A proximity touch point of the pointer on the touch screen can correspond to a point on the touch screen from which the pointer is situated perpendicularly with respect to the touch screen.

The proximity sensor 141 can detect a proximity touch and a proximity touch pattern, such as a proximity touch distance, a proximity touch duration, a proximity touch position, or a proximity touch movement state. For example, information corresponding to the detected proximity touch action and proximity touch pattern can be displayed on the touch screen.

The audio output module 152 can output audio data received from the wireless communication unit 110, or stored in the memory 160, in a call-receiving mode, a call-placing mode, a recording mode, a speech recognition mode, or a broadcast receiving mode. During operation, the audio output module 152 can also provide audio signals related to particular functions performed by the mobile terminal 100, such as when a call or a message is received. For example, the audio output module 152 can include a speaker, a buzzer or other audio producing devices, or combinations thereof.

The alarm module 153 can output a signal for indicating the occurrence of an event of the mobile terminal 100. For example, alarms can be generated when a call or message is received, or when a touch input is received. In addition to video signals or audio signals, the alarm module 153 can output a signal to indicate the occurrence of an event through vibration. The video signals or the audio signals can also be output through the display module 151 or the audio output unit 152. As such, the display module 151 or the audio output module 152 can be considered a part of the alarm module 153.

The haptic module 154 can generate various tactile effects that can be physically sensed by the user. For example, a tactile effect generated by the haptic module 154 can include a vibration. The strength and/or pattern of the vibration generated by the haptic module 154 can be controlled. For example, different vibrations can be combined and provided or sequentially provided.

The haptic module 154 can generate a variety of tactile effects in addition to the vibration, such as a stimulation caused by an arrangement of vertically moving pins that are in contact with the skin of the user, a stimulation caused by an injection of air through an injection hole or a suction of air through a suction hole; a stimulation caused by skimming over the surface of the user's skin; a stimulation caused by contact with an electrode; a stimulation caused by an electrostatic force; and a stimulation caused by the application of cold and warm temperatures using an endothermic or exothermic device.

The haptic module 154 can not only transmit tactile effects through direct contact, but also allow the user to feel tactile effects via a muscle sense of the user's fingers or arms. For example, the mobile terminal 100 can include at least two haptic modules 154.

The projector module 155 is the element for performing an image projector function using the mobile terminal 100. In one embodiment, the projector module 155 can be configured to display an image identical to or partially different from an image displayed on the display module 151 on an external screen or wall according to a control signal of the controller 180.

For example, the projector module 155 can include a light source (not shown in the drawing), such as a laser, that generates adequate light for external projection of an image, means for producing the image (not shown in the drawing) to be projected via the light generated from the light source, and a lens (not shown in the drawing) for enlarging the projected image according to a predetermined focus distance. The projector module 155 can further include a device (not shown in the drawing) for adjusting the direction the image is projected by mechanically moving the lens or the entire projector module 155.

The projector module 155 can be classified as a cathode ray tube (CRT) module, a liquid crystal display (LCD) module, or a digital light processing (DLP) module according to a type of a display. For example, the DLP module operates by enabling the light generated from the light source to reflect on a digital micro-mirror device (DMD) chip and can advantageously reduce the size of the projector module 155.

The projector module 155 can preferably be configured in a lengthwise direction along a side, front or back of the mobile terminal 100. It should be understood, however, that the projector module 155 can be configured on any portion of the mobile terminal 100.

The memory 160 can store software programs for operation of the controller 180, and can store input/output data, such as a phone book, messages, still images, and/or moving images. The memory 160 can further store data related to various patterns of vibrations and audio signals for output when a touch input is applied to the touch screen 151.

The memory unit 160 can be used to store various types of data to support the processing, control, and storage requirements of the mobile terminal 100. For example, the data can be program instructions for applications operated by the mobile terminal 100, contact data, phonebook data, messages, audio, still pictures or moving pictures.

A recent use history or a cumulative use frequency of each type of data can be stored in the memory unit 160, such as a usage frequency of each phonebook, message or multimedia. Moreover, data for various patterns of vibration and/or a sound output when a touch input is performed on the touchscreen can be stored in the memory unit 160.

The memory 160 can be implemented using any type or combination of suitable volatile and non-volatile memory or storage devices, such as a flash memory, a hard disk type memory, a multimedia card micro type memory, a card type memory, such as a Secure Digital (SD) card or Extreme Digital (xD) card, a random access memory (RAM), a static random access memory (SRAM), a read-only memory (ROM), an erasable programmable read-only memory (EPROM), a programmable ROM (PROM), an electrically erasable programmable read-only memory (EEPROM), a magnetic memory, a magnetic disk, an optical disk, or other memory of data storage device. In other embodiments, the memory 160 can be a storage device that can be accessed by the mobile terminal 100 via the Internet.

The interface unit 170 can couple the mobile terminal 100 to external devices. The interface unit 170 can receive data from the external devices or power, and transmits the data or power to internal components of the mobile terminal 100. In addition, the interface unit 170 can transmit data of the mobile terminal 100 to the external devices.

The interface unit 170 in FIG. 1 can be configured using, for example, a wired or wireless headset port, an external charger port, a wired or wireless data port, a memory card port, a port for coupling to a device having an identity module, audio input/output (I/O) ports, a video I/O ports, and/or an earphone port.

The identity module is the chip for storing various kinds of information for authenticating the authority to use the mobile terminal 100. For example, the identity module can be a user identify module (UIM), a subscriber identify module (SIM) or a universal subscriber identify module (USIM). A device including the user identity module (hereinafter called "identity device") can also be manufactured in the form of a smart card. Therefore, the identity device can be connected to the mobile terminal 100 via a corresponding port of the interface unit 170.

When the mobile terminal 100 is connected to an external cradle, the interface unit 170 can serve as a conduit to allow power from the cradle to be supplied to the mobile terminal 100, or can serve as a conduit to allow various command signals input by the user via the external cradle to be transmitted to the mobile terminal 100. Each of the various command signals input from the external cradle, or power provided by the external cradle, can be used as a signal for confirming whether the mobile terminal 100 is properly set on the external cradle.

The controller 180 can control the general operations of the mobile terminal 100. For example, the controller 180 can be configured to perform control and processing associated with voice calls, data communication, and/or video calls. The controller 180 can include a multimedia module 181 for playing multimedia. The multimedia module 181 can be integrated into the controller 180 as shown in FIG. 1, or can be external to the controller 180. The controller 180 can perform a pattern recognition processing to recognize a character or image from a handwriting input or a picture-drawing input performed on the touch screen.

The power supply 190 can receive external power or internal power, or combinations thereof, and provide power required for operating the components of the mobile terminal 100 under the control of the controller 180.

The embodiments described herein may be implemented in a computer-readable medium using, for example, computer software, hardware, or a combination thereof. The embodiments described herein can be implemented in hardware using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electronic units designed to perform the functions described herein, or a combination thereof. In other embodiments, such components can be implemented by the controller 180.

The embodiments described herein can be implemented with separate software modules, such as procedures and functions, each of which perform one or more of the functions and operations described herein. Software codes can be implemented by a software application written in any suitable programming language. The software codes can be stored in memory, such as the memory 160, and executed by a controller or processor, such as the controller 180.

A method of managing object related information in the mobile terminal 100 will now be described including the storage of the object related information and transmission/reception of the object related information.

FIG. 2 is a flowchart 200 of a method for managing object related information according to one embodiment of the present invention.

With reference to FIG. 2, the mobile terminal 100 can receive position information (also herein referred to as "terminal position information") of the mobile terminal 100 using the wireless communication unit 110 under the control of the controller 180 (S210).

In one embodiment, the mobile terminal 100 can receive the terminal position information using the position location module 115. For example, the mobile terminal 100 can receive the terminal position information from satellites by using the global positioning system (GPS) periodically or at a random timing point. When GPS is used, the terminal position information can include a longitude, a latitude, an altitude, coordinates, time information, and speed information at the point where the mobile terminal 100 is located.

In another embodiment, the mobile terminal 100 can receive terminal position information using distances and directions related to two or more neighbor base stations from a random base station, such as a serving base station, and by applying computational methods, such as triangulation.

Furthermore, the terminal position information can include a direction of view of the camera 121 or a direction faced by the mobile terminal 100 at a current position of the mobile terminal 100. The mobile terminal 100 can further include a motion detection sensor (not shown) that can be used to detect the direction of view of the camera 121. For example, the direction of view of the camera 121 can be represented as one or more directions, such as east, west, south, north, top and bottom.

With reference to FIG. 2, the mobile terminal 100 receives at least one object related information corresponding to the terminal position information from an external server using the wireless communication unit 110 under the control of the controller 180 (S220).

In one embodiment, the controller 180 can receive object related information of each of one or more objects located within a predetermined distance from the mobile terminal 100 with reference to the received terminal position information. In such a case, the one or more objects corresponding to the received object related information can be located within the predetermined distance from a current position of the mobile terminal 100 obtained from the terminal position information, and in the direction of view of the camera 121 or the direction faced by the mobile terminal 100.

The one or more objects located within the predetermined distance from the mobile terminal 100 can be, for example, a building, a shopping center, or a store, and can have their own address information or position information. The object related information is the information related to an object and can include a name of the object, such as a point of interest (POI), a representative icon of the object, a representative image of the object, phone number information of the object, Web site address information of the object, and rating information regarding the object.

The object related information can further include position information of the object, such as address information, coordinated information, or a distance from the mobile terminal 100. For example, the object related information may exist only for some of the one or more objects located within the predetermined distance from the mobile terminal 100.

In one embodiment, the controller 180 can receive the object related information of each of the one or more objects located ahead of the mobile terminal 100 and within a predetermined distance from the mobile terminal 100. For example, the controller 180 can recognize a current position of the mobile terminal 100 using the coordinate information included in the terminal position information and can recognize an area ahead of the mobile terminal 100 from the current position using the direction of view of the camera 121 included in the terminal position information.

The mobile terminal 100 can transmit a signal for requesting the object related information of each of the one or more objects located ahead of the mobile terminal 100 and within the predetermined distance from the mobile terminal 100 to an external server and can receive such object related information from the external server. For example, the request signal can include position information of each of the one or more objects or the terminal position information and a predetermined distance for displaying the object related information.

In one embodiment, the mobile terminal 100 can receive the object related information corresponding to the position information included in the request signal from the external server. In another embodiment, the mobile terminal 100 can receive the object related information of each of the one or more objects located ahead of the mobile terminal 100 and within the predetermined distance from a current position of the mobile terminal 100 from the external server.

With reference to FIG. 2, the mobile terminal 100 can display an object indicator that indicates the one or more objects on a background image via the display module 151 under the control of the controller 180 (S230). The one or more objects can include the object corresponding to the object related information received in operation S220.

The object indicator can indicate identity information of a corresponding object on the background image at the estimated location of the corresponding object. For example, the object indicator can include a representative icon of the corresponding object, a representative image of the corresponding object, a name of the corresponding object, and a phone number of the corresponding object.

The background image can be a preview image of an image input via the camera 121 or a map image covering an area within a predetermined distance from a current position of the mobile terminal 100 based on the terminal position information. Therefore, the background image can be an actual view of the current position of the mobile terminal 100.

In operation S230, the mobile terminal 100 can further display a storage target indicator region under the control of the controller 180 while displaying the background image and the object indicator. For example, the storage target object indicator region can represent the region in which an identifier corresponding to the object indicator selected by a user to be stored is displayed. Therefore, the user is able to intuitively confirm which object indicator is the storage target.

The storage target object indicator region can be displayed if the mobile terminal 100 is set to an operating state that allows storing the object indicator or the object related information. The storage target object indicator region can be displayed if a user inputs a storage command for storing the object indicator. Alternatively, the storage target object indicator region can be displayed as a default irrespective of a user command.

The operation of the mobile terminal 100 when the background image is the preview image will now be discussed. If the mobile terminal 100 enters a camera mode or an augmented reality driving mode, the mobile terminal 100 activates the camera 121 and is able to receive an image input via the camera 121. In this case, the camera mode or the augmented reality driving mode can be entered if a corresponding menu item, a corresponding key or a corresponding key zone is selected. Moreover, while an image input via the camera 121 in the camera mode is displayed as a preview image, the augmented reality driving mode can be re-entered.

Augmented reality pertains to a field of virtual reality and involves a type of computer graphic scheme that enables a virtual object to appear as a real world object in a real world environment by synthesizing the virtual object with a real world environment. Therefore, the mobile terminal 100 can display a virtual object or image synthesized over an image indicating a real world environment that is input via the camera 121 in the augmented reality driving mode.

In operation S230, the mobile terminal 100 can display an object indicator that is linked to an object image corresponding to an object within the background image. For example, if the object indicator is "LG Electronics" and the corresponding object is the LG Electronics building, the object indicator "LG Electronics" can be displayed by being linked to an image of the LG Electronics building within the background image.

Moreover, even if an object image corresponding to an object indicator does not exist in the background image, the object indicator can be displayed at an estimated position of the corresponding object as though existing in the background image.

With reference to FIG. 2, the mobile terminal 100 can receive a selection of a specific one of the one or more object indicators displayed on the background image via the user input unit 130 (S240).

In operation S240, in order to prevent an image from swaying, the mobile terminal 100 can be provided with a pause button or a pause zone via the display module 151. If the pause button is selected, the mobile terminal 100 can display a background image at the moment the pause button is selected and an object indicator in the background image irrespective of any shaking experienced by the mobile terminal 100. Therefore, a user is able to promptly and conveniently select a specific object indicator in a background image.

The mobile terminal 100 can display an identifier corresponding to the selected specific object indicator within the storage target object indicator region displayed under the control of the controller 180. The mobile terminal 100 enables the object related information (also herein referred to as "specific object related information") of the object indicated by the selected specific object indicator to be stored in the memory 160 under the control of the controller 180 (S250).

In operation S250, the mobile terminal 100 can be configured to further store the terminal position information, time information and/or the background image at the moment the specific object related information is stored under the control of the controller 180. Moreover, in operation S250, the mobile terminal 100 can classify and store the specific object related information as an object type or an object category, a storage date and time, and/or an object position under the control of the controller 180.

Operations S240 and S250 will now be described with reference to FIGS. 3A through 3C and FIGS. 4A through 4C. In the exemplary embodiment of FIGS. 3A through 3C and FIGS. 4A through 4C, the background image is a preview image.

Figure 3A:
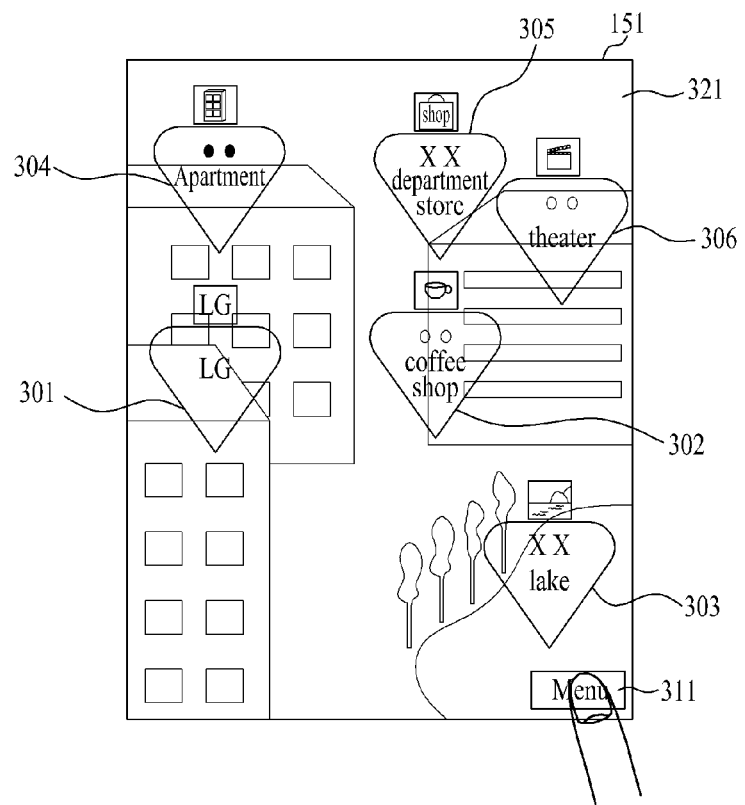
FIGS. 3A through 3C are exemplary display screens of the display module showing an operation of the mobile terminal for displaying a number of object indicators on a preview image in accordance with various embodiments of the present invention.
Figure 3B:
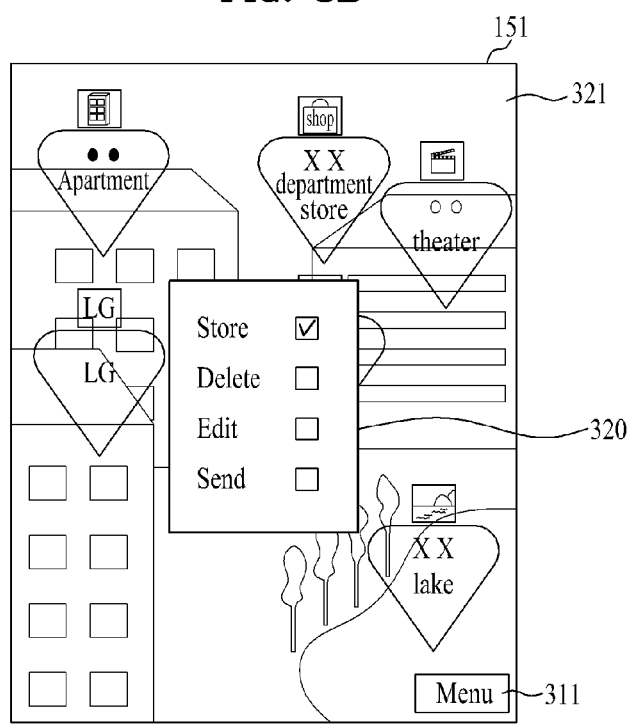
Figure 3C:
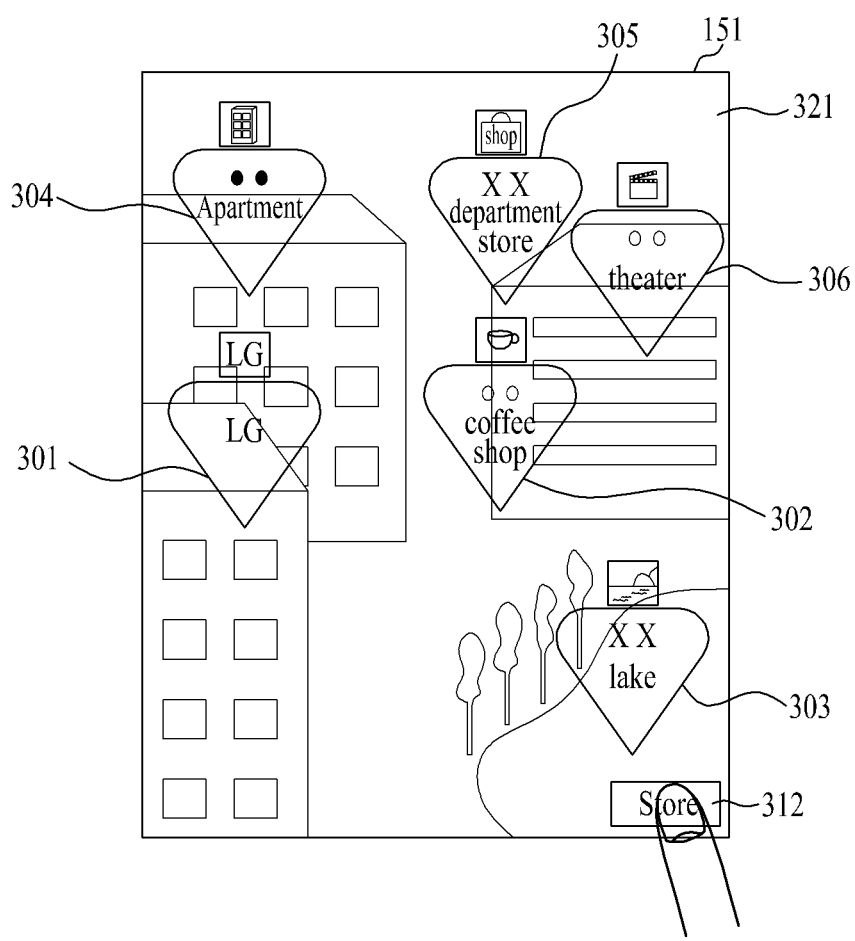

FIGS. 3A through 3C are exemplary display screens of the display module 151 showing an operation of the mobile terminal 100 for displaying a number of object indicators 301 through 306 on a preview image 321.

Referring to FIG. 3A, if a menu zone 311 provided on the preview image 321 is selected or touched by a user, the mobile terminal 100 can display a list 320 of executable commands with respect to the currently displayed object indicators as shown in FIG. 3B. For example, the list 320 can include various commands, such as store, delete, edit, and/or send as displayed on the preview image 321 of FIG. 3B.

Referring to FIG. 3C, the mobile terminal 100 can be configured to display a store zone 312 on the preview image 321 for receiving a store command input for storing the one or more object indicators currently displayed. For example, if the store command is selected from the list 320 shown in FIG. 3B or if the store zone 312 in FIG. 3C is selected, the mobile terminal 100 can enter a storage mode for storing the object indicators 301 to 306 currently displayed on the preview image 321.

Figure 4A:
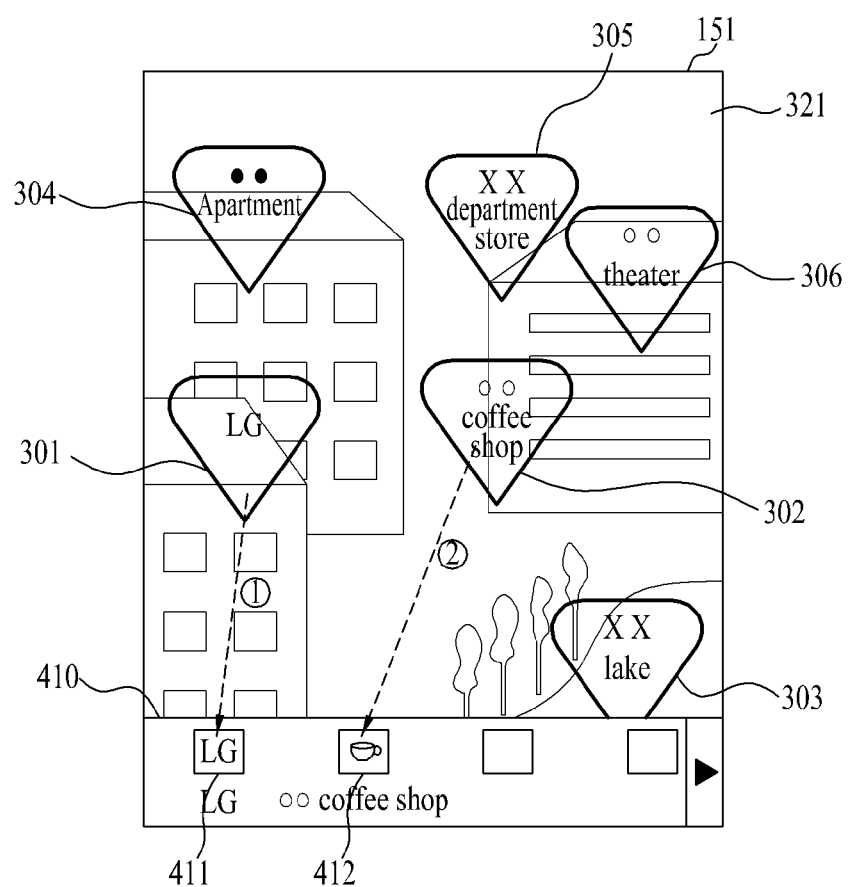
FIGS. 4A through 4C are exemplary display screens of the display module showing an operation of the mobile terminal for receiving a selection of a specific one of a number of the object indicators shown in FIGS. 3A and 3B when a storage mode for storing the object indicators is entered by the mobile terminal in accordance with various embodiments of the present invention.
Figure 4B:
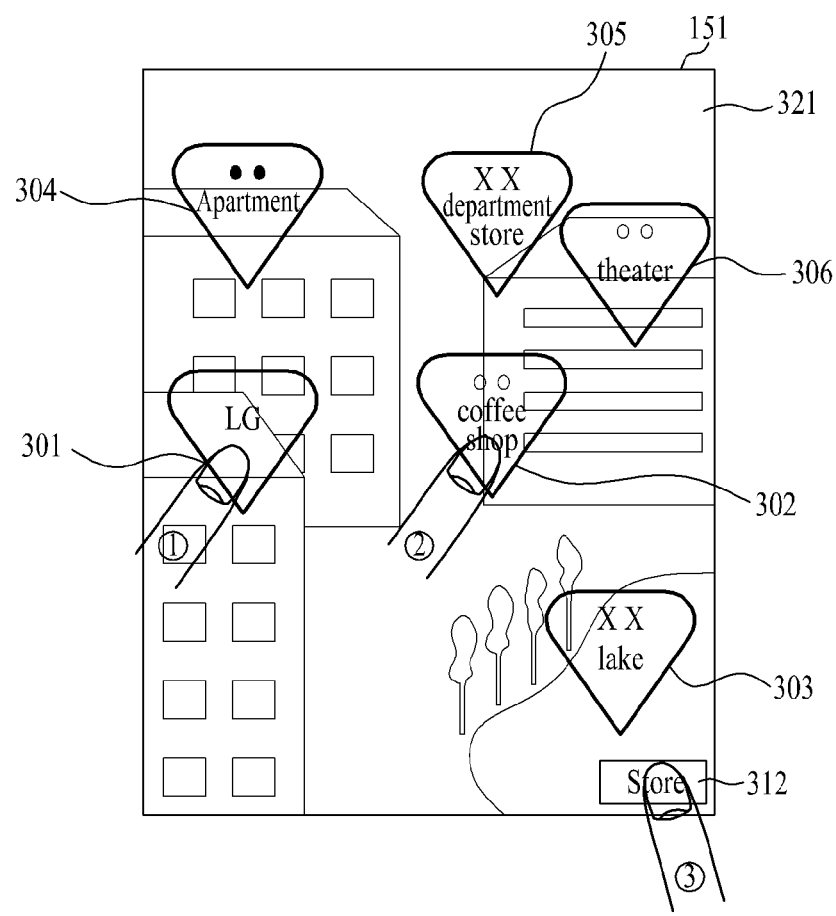
Figure 4C:
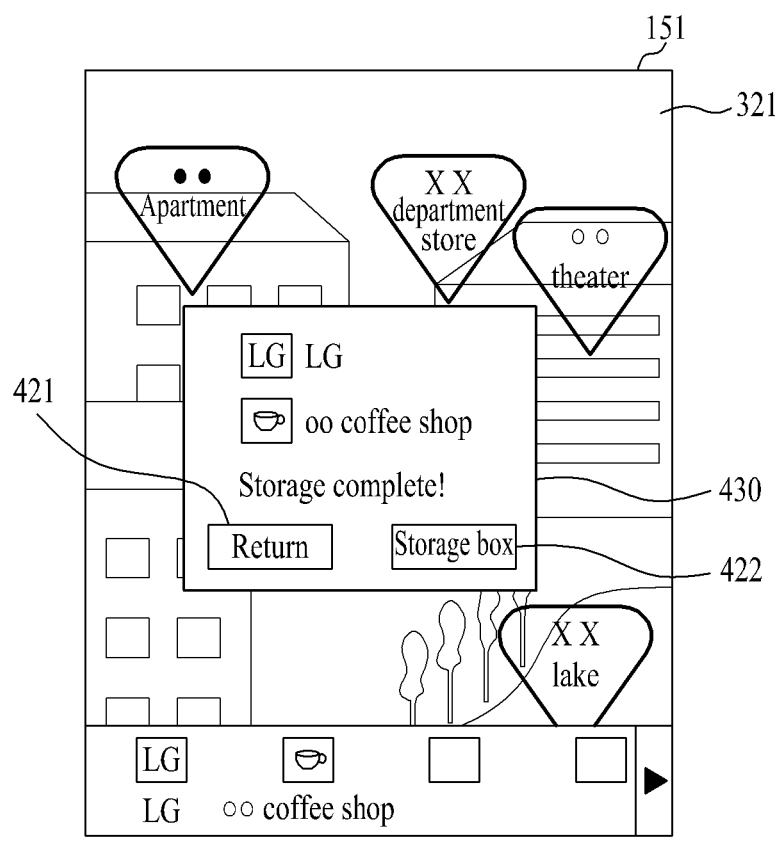

FIGS. 4A through 4C are exemplary display screens of the display module 151 showing an operation of the mobile terminal 100 for receiving a selection of a specific one of a number of the object indicators 301 to 306 shown in FIGS. 3A and 3B when a storage mode for storing the object indicators 301 to 306 is entered by the mobile terminal 100 in accordance with various embodiments of the present invention.

Referring to FIG. 4A, when the mobile terminal 100 enters the storage mode, the mobile terminal 100 can be configured to display a storage target object indicator region 410 in a prescribed region on the preview image 321. For example, in the storage target object indicator region 410, four object indicators can be designated as storage target object indicators on a single page.

In FIG. 4A, if a user provides a touch input on each of first and second object indicators 301 and 302, or a touch and drag input from each of the first and second object indicators 301 and 302 to the storage target object indicator region 410, the mobile terminal 100 can designate the first and second object indicators 301 and 302 as the storage target object indicators and display a first identity icon 411 corresponding to the first object indicator 301 and a second identity icon 412 corresponding to the second object indicator 302 in the storage target object indicator region 410.

Alternatively, with reference to FIG. 4B, when the mobile terminal 100 enters the storage mode, if a user provides a touch input on each of the first and second object indicators 301 and 302 on the preview image 321 and a touch input on the store zone 312, the mobile terminal 100 can designate the first and second object indicators 301 and 302 as the storage target object indicators.

In such a case, a storage target object indicator region can be provided in a prescribed region on the preview image 321 and first and second identity icons corresponding to the first and second object indicators 301 and 302 can be displayed within the storage target object indicator region in a similar manner as described with respect to FIG. 4A. Therefore, the mobile terminal 100 can store the object related information of each of the first and second object indicators 301 and 302 designated as the storage target object indicators in the memory 160.

In FIG. 4A and FIG. 4B, a number of the object indicators 301 through 306 can be identifiably displayed to indicate that the mobile terminal 100 has entered the storage mode. For example, the thickness level and/or color of the object indicators 301 through 306 can be configured to be different before and after the mobile terminal 100 has entered the storage mode. Alternatively, items displayed in the display module 151 can be configured to move after the mobile terminal has entered the storage mode.

Referring to FIG. 4C, the mobile terminal 100 can output information 430 indicating that the object related information of the first and second object indicators 301 and 302 in FIGS. 4A and 4B are designated as the storage target object indicators. The information 430 can be output using various methods, such text, an image, and/or audio.

The return zone 421 in FIG. 4C can be selected to exit the storage mode of the mobile terminal 100 and enter a mode for receiving a selection of the object indicators shown in FIG. 4A and FIG. 4B. The storage box zone 422 in FIG. 4C can be selected to enter a mode of the mobile terminal 100 for checking the currently stored object related information.

Referring now to FIG. 2, the mobile terminal 100 can display an object item list on the display module 151 including one or more object items corresponding to the object related information, such as the object related information stored in operation S250, stored in the memory 160 (S260).

In one embodiment, an object item of the object item list can be an item that indicates the object of which object related information is stored in the memory 160. For example, the object item can include a representative icon, a representative image, or a name in the object related information of the corresponding object.

In operation S260, the mobile terminal 100 can display one or more object images for each corresponding one of the one or more object items as a thumbnail on the object item list. For example, an object image can include a representative image of an object and/or a representative icon of an object as one of the object related information.

Figure 5A:
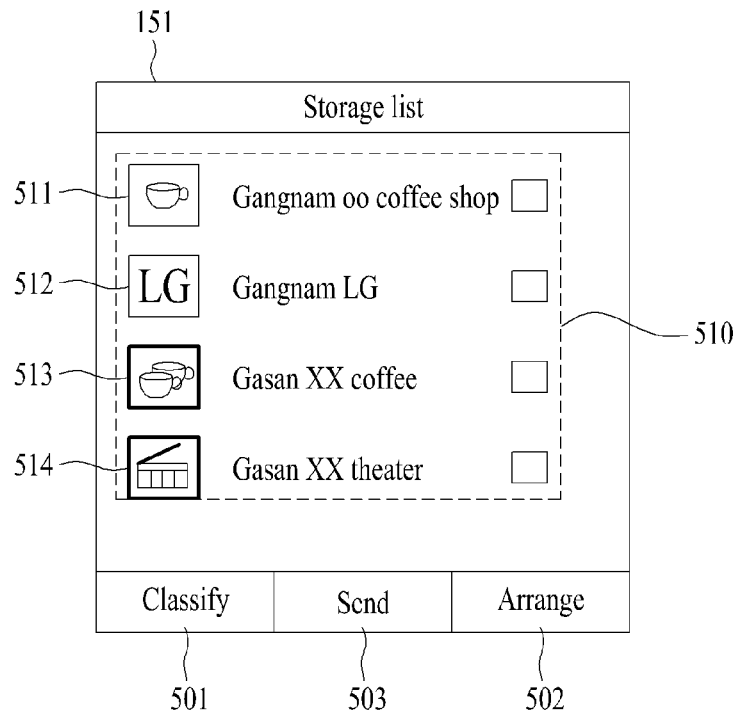
FIGS. 5A and 5B are exemplary display screens of the display module showing an operation of the mobile terminal for displaying an object item list on the display module in accordance with various embodiments of the present invention.
Figure 5B:
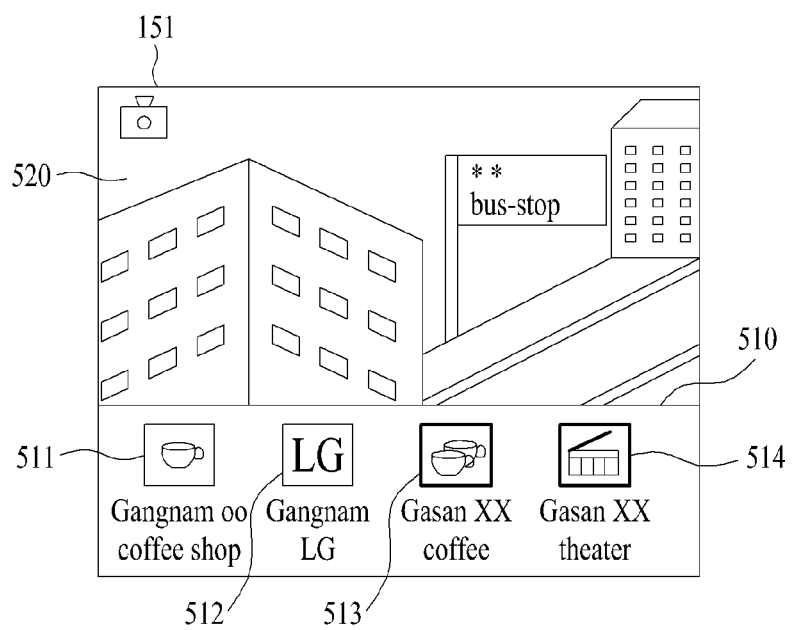

Operation S260 in FIG. 2 will now be described with reference to FIGS. 5A and 5B, 6A through 6L and 7A through 7C. FIGS. 5A and 5B are exemplary display screens of the display module 151 showing an operation of the mobile terminal for displaying an object item list on the display module 151 in accordance with various embodiments of the present invention.

Referring to FIG. 5A, the mobile terminal 100 can display an object item list 510 on the display module 151, which includes object items of each corresponding object related information stored in the memory 160. In one embodiment, the object item list 510 can be displayed using multiple pages, such that each page includes four object items, such as object items 511 through 514 in FIG. 5A.

Referring to FIG. 5B, the mobile terminal 100 can display an object item list 510 on a prescribed region of a preview image 520, such that the object item list 510 overlaps the preview image 520. In one embodiment, the mobile terminal 100 can partition the display screen into different regions and can display the object item list 510 and the preview image 520 in the different regions. For example, the mobile terminal 100 can partition the display screen into first and second regions and can display the preview image 520 in the first region and the object item list 510 in the second region. Therefore, the display region of the preview image 520 or the display region of the object item list 510 can be freely set.

The preview image 520 shown in FIG. 5B can be either an image of a real world environment currently input via the camera 121, a map image based on a current position of the mobile terminal 100 obtained from the terminal position information, or a virtual image, which corresponds to current terminal position information, received from an external server or previously stored in the mobile terminal 100.

In FIGS. 5A and 5B, the mobile terminal 100 can identifiably display object items 513 and 514 corresponding to a current position of the mobile terminal 100, and more particularly, object indicators 513 and 514 of objects that are within a predetermined radius from the current position of the mobile terminal 100. For example, if a current position of the mobile terminal 100 is at "Gasan Digital Center Station," an object item corresponding to the current position of the mobile terminal 100 can be an object item of an object that is within a radius of 1 Km from Gasan Digital Center Station.

FIGS. 6A through 6L are exemplary display screens of the display module 151 showing an operation of the mobile terminal 100 for displaying an object item list based on either an object type, an object position, or a storage time and date is accordance with various embodiments of the present invention.

Figure 6A:
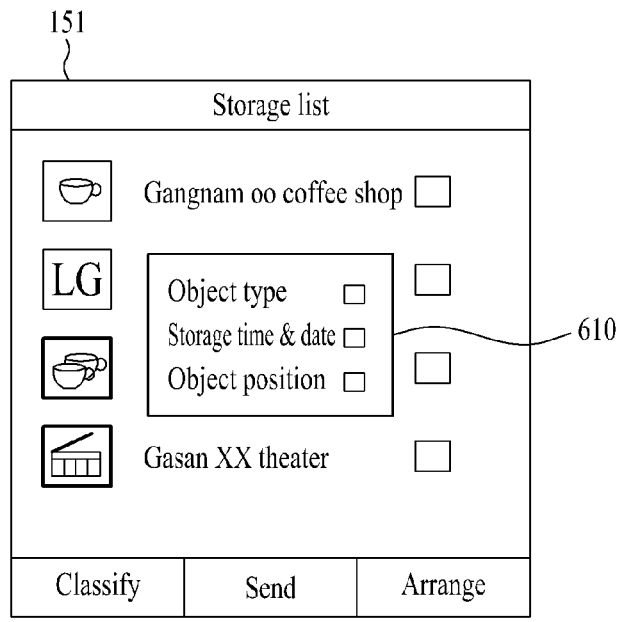
FIGS. 6A through 6L are exemplary display screens of the display module showing an operation of the mobile terminal for displaying an object item list based on either an object type, an object position, or a storage time and date is accordance with various embodiments of the present invention.

In one embodiment, an input for a command for displaying an object item list classification can be received from a user and the mobile terminal 100 can display the display screen configurations shown in FIGS. 6A through 6L. For example, if a touch input is provided on the classify zone 501 provided in a prescribed region of the display screen shown in FIG. 5A, the mobile terminal 100 can display a classification condition list 610 on the display module 151 as shown in FIG. 6A. In one embodiment, the classification condition list 610 can include an object type, a storage time and date, and an object position.

For example, the object type can be a category of an object corresponding to an object item. The storage time and date can be a stored time and date of object related information corresponding to an object item. The object position can be a position of an object corresponding to an object item.

Figure 6B:
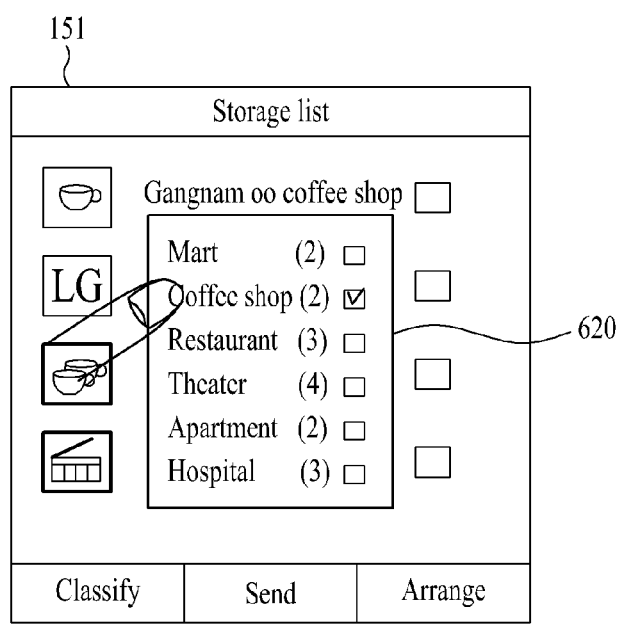
Figure 6C:
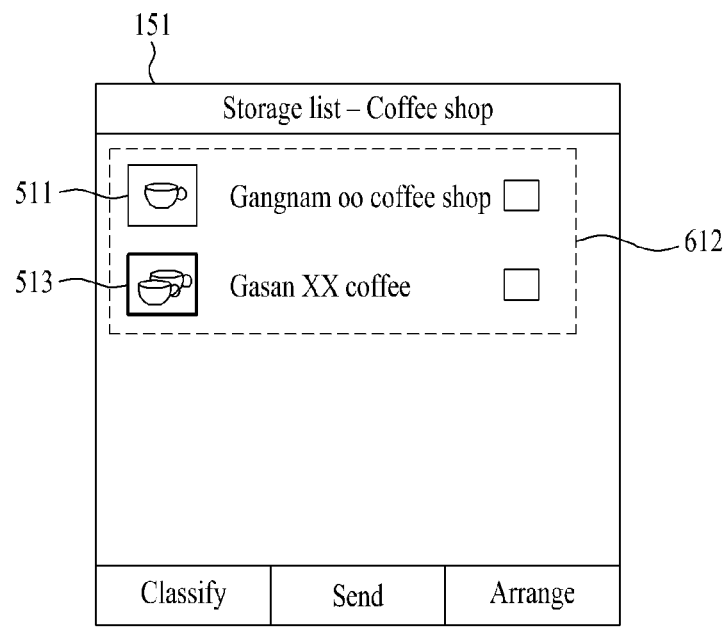

FIGS. 6B and 6C are exemplary display screens of the display module 151 showing an operation of the mobile terminal 100 when the object type in FIG. 6A is selected as the classification condition. Referring to FIG. 6B, the mobile terminal 100 can display an object type list 620 that includes selectable object types on the display module 151. For example, the object type list 620 can include object types, such as "Mart," "Coffee shop," "Restaurant," "Theater," "Apartment," and "Hospital." In addition, the number of objects of the stored object related information can be displayed with each of the object types as shown in FIG. 6B.

Figure 6D:
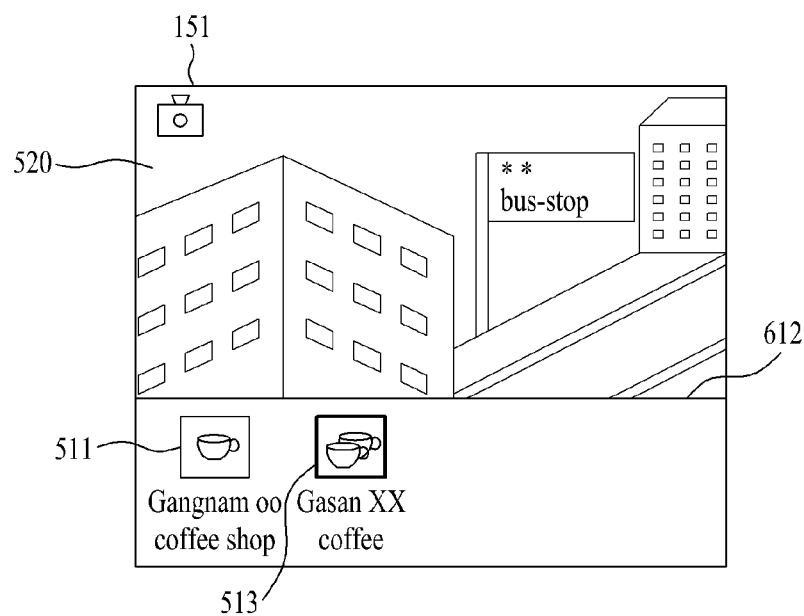

For example, with reference to FIG. 6C, if the "Coffee shop" object type in FIG. 6B is selected, the mobile terminal 100 can display an object item list 612 including object items, such as object items 511 and 513, of the stored object related information that have a "Coffee shop" object type. The mobile terminal 100 can display either only the object item list 612 as shown in FIG. 6C or an object item list 612 together with the preview image 520 as shown in FIG. 6D.

Figure 6E:
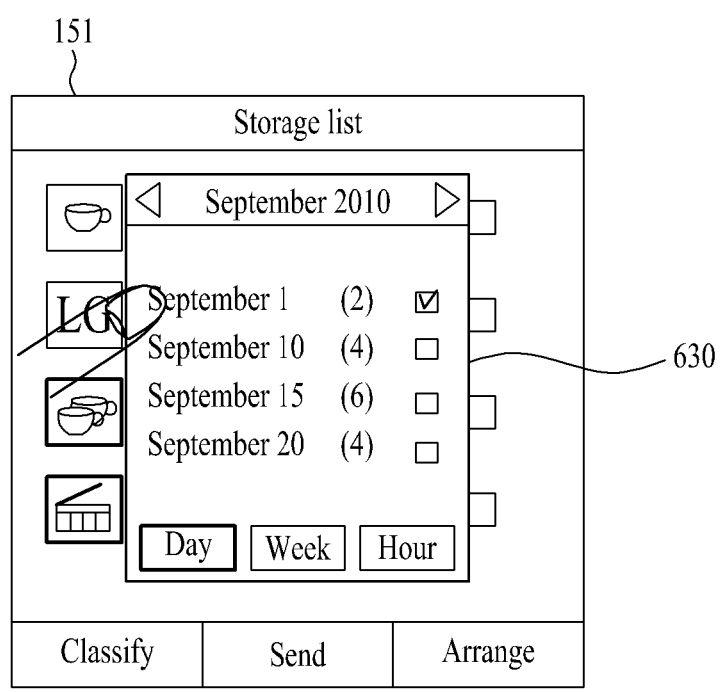
Figure 6F:
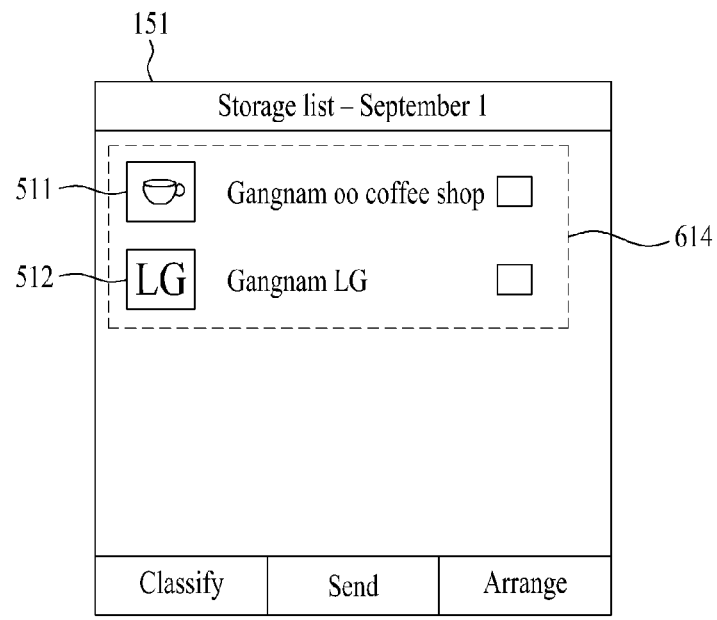

FIGS. 6E and 6F are exemplary display screens of the display module 151 showing an operation of the mobile terminal 100 when the storage time and date in FIG. 6A are selected as the classification condition. Referring to FIG. 6E, the mobile terminal 100 can display a storage time and date list 630 on the display module 151 including stored times and dates of the stored object related information.

For ease of description, the classification unit of the storage time and date list 630 shown in FIG. 6E is set to the "Day" option. It should be understood, however, that the classification unit can be set to the "Week" or "Hour" options in other embodiments. For example, each of the storage times and dates can include the number of objects corresponding to the stored object related information.

Figure 6G:
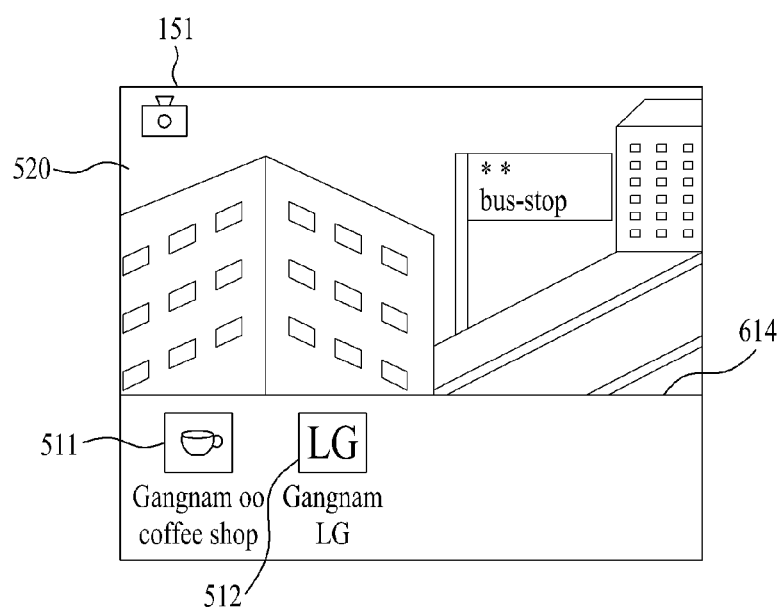

Referring to FIG. 6F, if "September 1" is selected in FIG. 6E, the mobile terminal 100 can display an object item list 614 including object items, such as object items 511 and 512, of the stored object related information that have a storage date of "September 1." For example, the mobile terminal 100 can display either only the object item list 614 as shown in FIG. 6F, or an object item list 614 together with the preview image 520 as shown in FIG. 6G.

Figure 6H:
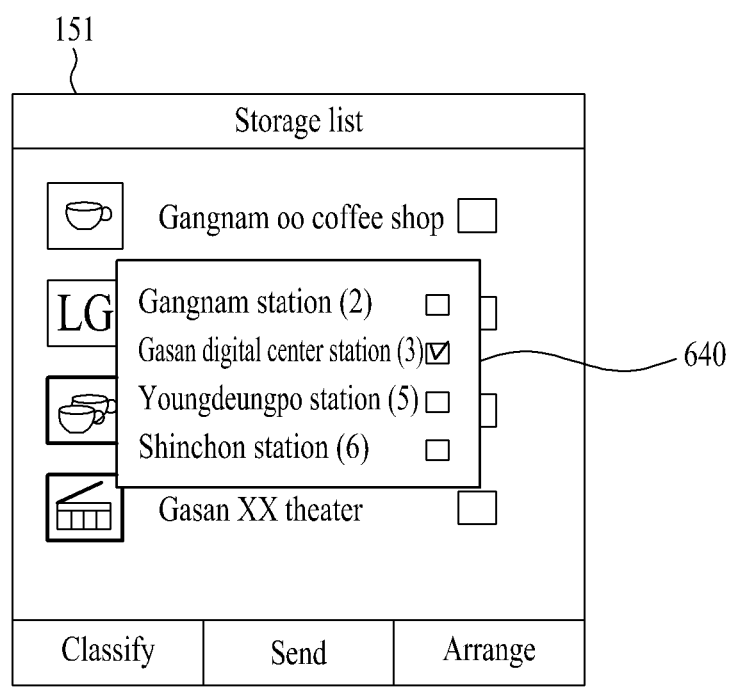
Figure 6I:
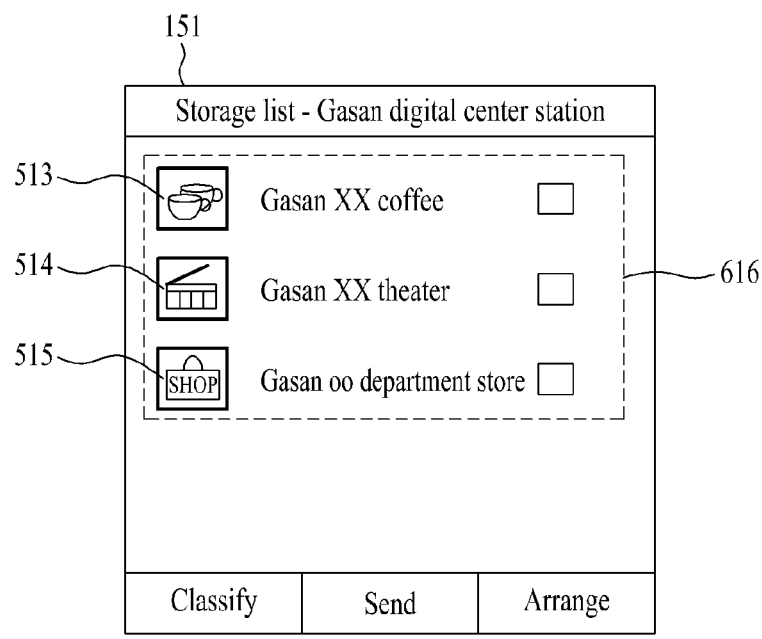
Figure 6J:
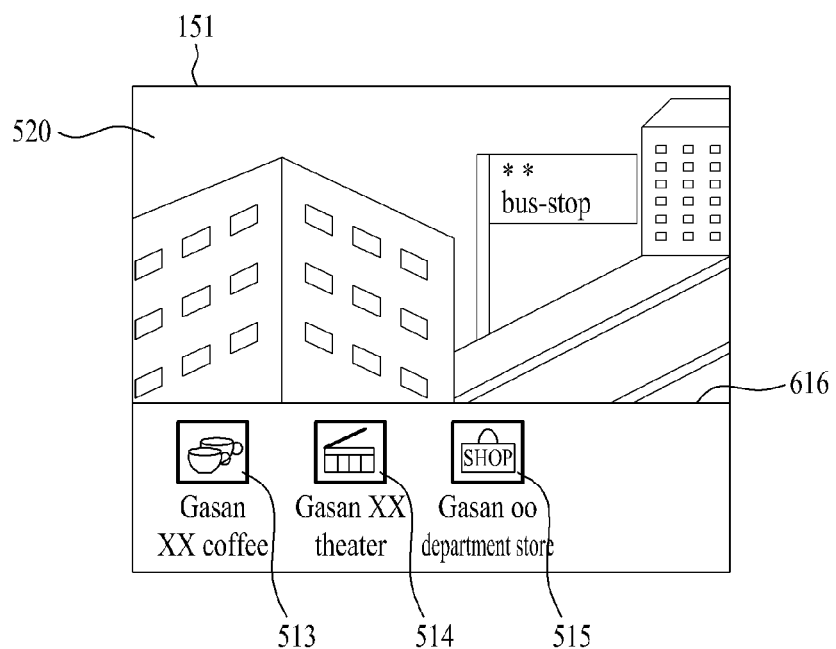

FIGS. 6H through 6J are exemplary display screens of the display module 151 showing an operation of the mobile terminal 100 when the object position is selected in FIG. 6A as the classification condition. Referring to FIG. 6H, the mobile terminal 100 can display an object position list 640 including object positions of the stored object related information on the display module 151.

For ease of description, it is assumed that the classification unit of the object position list 640 is set to "subway stations." It should be understood, however, that the classification unit can be set to either "state," "county," "city," or "direct setting unit" in other embodiments. For example, each of the object positions can include the number of objects corresponding to the stored object related information.

Referring to FIG. 6I, if "Gasan digital center station" is selected in FIG. 6H, the mobile terminal 100 can display an object item list 616 including object items, such as object items 513, 514 and 515, of the stored object related information having the "Gasan digital center station" object position. The mobile terminal 100 can display either only the object item list 616 as shown in FIG. 6I, or an object item list 616 together with a preview image 520 as shown in FIG. 6J.

In addition, if "Gasan digital center station" is the current position of the mobile terminal 100, all of the object items included in the object item list 616 are object items having a position that match the current position of the mobile terminal 100. Such object items having a position that match the current position of the mobile terminal 100 can be indicated by being displayed in a distinguished manner.

Figure 6K:
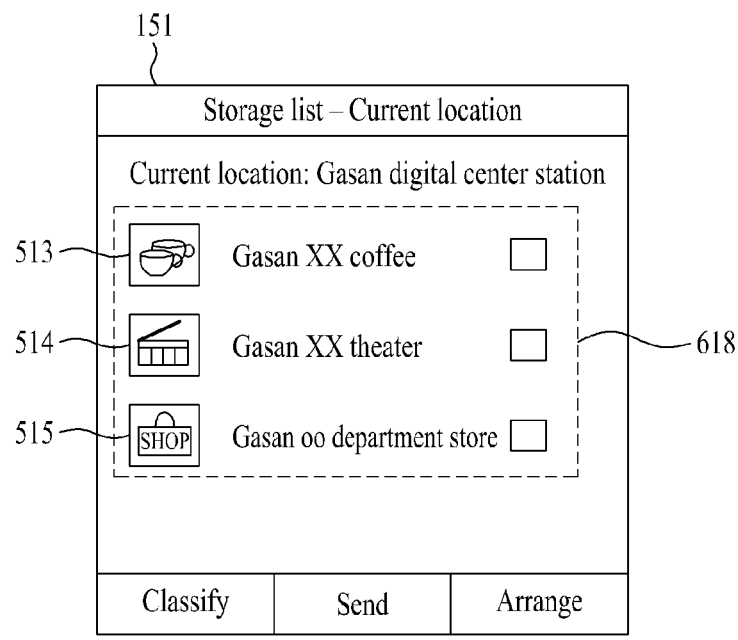
Figure 6L:
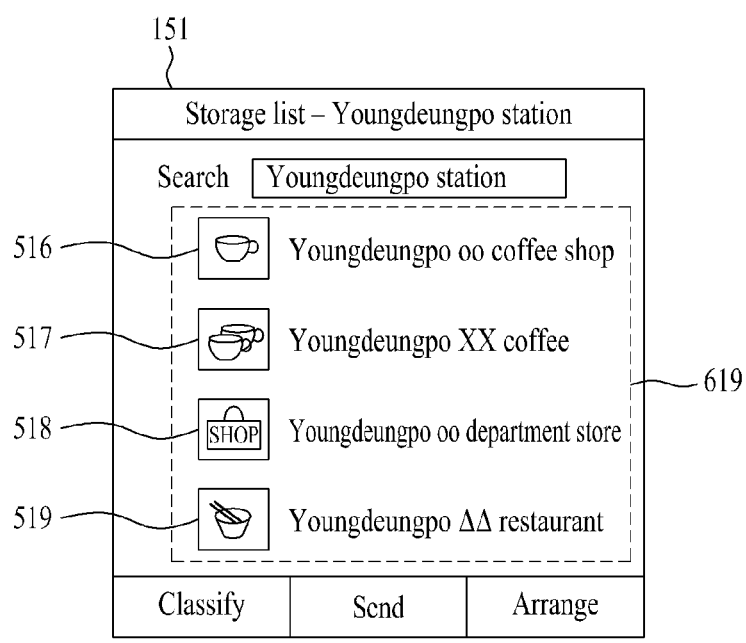

FIGS. 6K and 6L are exemplary display screens of the display module 151 showing an operation of the mobile terminal 100 for displaying an object item list including an object item corresponding to terminal position information or a user-specific position. For example, with reference to FIG. 6K, the mobile terminal 100 can be configured to display only an object item list, such as object item list 618, including object items corresponding to a current position of the mobile terminal 100 based on terminal position information.

For example, if a current position of the mobile terminal 100 is "Gasan digital center station," the mobile terminal 100 can display an object item list 618 including object items 513, 514 and 515 corresponding to stored object related information of objects located within a predetermined radius of "Gasan digital center station."

Referring to FIG. 6L, the mobile terminal 100 can receive an input of a specific position from a user and can display an object item list 619 that only includes object items corresponding to the specific position. For example, if the specific position input by the user is "Youngdeungpo Station," the mobile terminal 100 can display the object item list 619 including object items 516, 517, 518 and 519 corresponding to stored object related information of objects located within a predetermined radius of "Youngdeungpo Station."

Figures 7A, 7B:
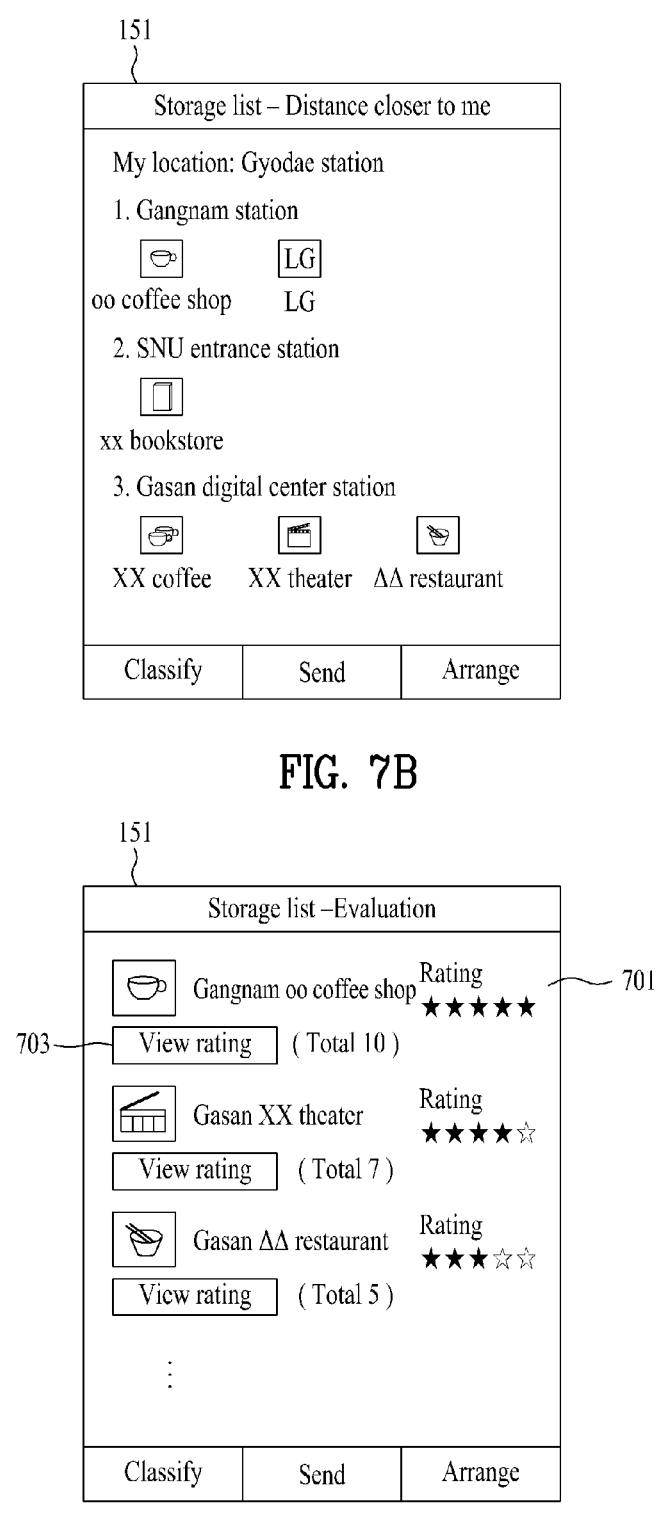
Figure 7C:
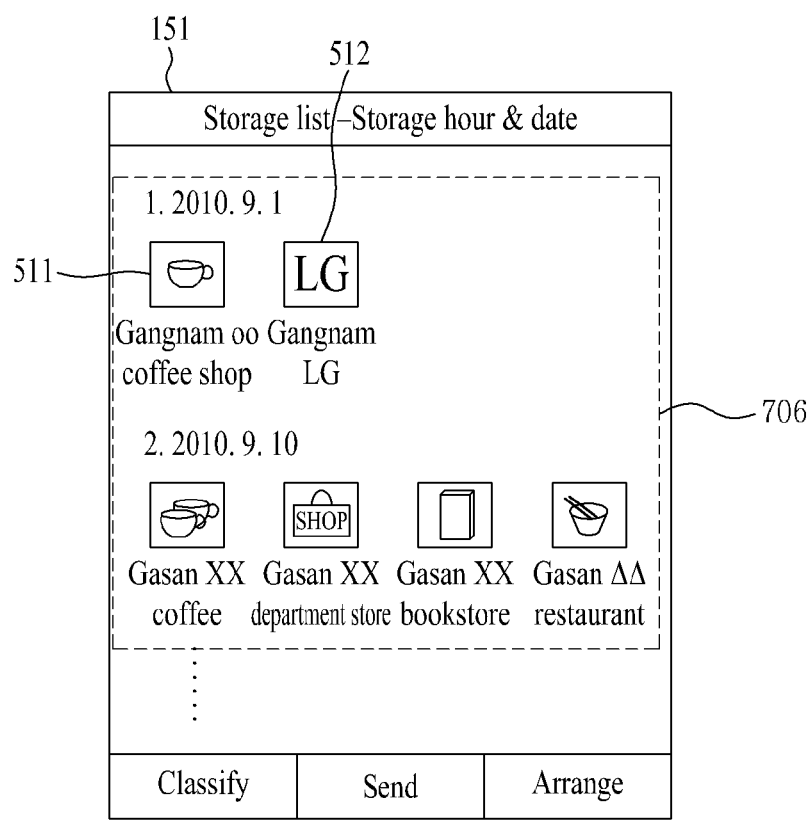

FIGS. 7A through 7C are exemplary display screens of the display module 151 showing an operation of the mobile terminal 100 for displaying an object item list based on priority in accordance with various embodiments of the present invention. In one embodiment, with reference to FIG. 5A, the mobile terminal 100 can receive an input for a command for displaying an object item list based on priority when a user provides a touch input on the arrange zone 502 in a prescribed region of the display module 151.

Referring to FIG. 7A, the mobile terminal 100 can arrange the order of object items according to distance from the current position of the mobile terminal 100 based on terminal position information, such that an object item closest to the current position of the mobile terminal 100 is first and an object item farthest from the current position of the mobile terminal 100 is last. In one embodiment, the mobile terminal 100 can check a distance to an object from the current position of the mobile terminal 100 using position information in the stored object related information.

For example, if a position reference is a subway station and the current position of the mobile terminal 100 is "Gyodae station," the mobile terminal 100 can check the positions of objects of the stored object related information and subway stations corresponding to the positions of the objects, and display object items of subway stations arranged in order according to distance closest to "Gyodae station." Therefore, the mobile terminal 100 can display object items that correspond to subway stations.

As another example, if a position reference is a distance and the current position of the mobile terminal 100 is designated as a reference point, the mobile terminal 100 can check distances to objects of the stored object related information and display the object items arranged in order according to distance closest to the current position of the mobile terminal 100.

With reference to FIG. 7A, distances to corresponding subway stations (not shown in FIG. 7A) or object items representing objects located closest to a current position of the mobile terminal 100 can be displayed together on the display module 151.

Referring to FIG. 7B, the mobile terminal 100 can display object items arranged in order according to rating information from the stored object related information. For example, the rating information can be represented by a number of stars displayed on the display module 151, such as stars 701, and can include various users' opinions on an object corresponding to the stored object related information and reviews with respect to the object.

Therefore, the mobile terminal 100 can provide a user with rating information, such as the stars 701, for an object represented by an object item. For example, the mobile terminal 100 can provide the rating information for an object if a touch input is provided on a "View rating" region 703 on the display module 151. As shown in FIG. 7B, a "View rating" region can be provided for each object item.

Referring to FIG. 7C, the mobile terminal 100 can display object items arranged in order according to a latest storage date and time using the storage date and time from the stored object related information. For example, the storage date and time can be indicated using one of various units, such as an hour, a day, or a week.

As shown in the embodiment of FIG. 7C, if two or more object items, such as object items 511 and 512, have a same storage date and time, an object item list 706 can be arranged in order according to storage date and time by displaying the two or more object items as belonging to the same storage date and time. In another embodiment, the mobile terminal 100 can display an object item list arranged in order according to highest frequency of use or arranged in order according to most recent use (not shown in the figures).

Referring now to FIG. 2, the mobile terminal 100 can receive an input for selecting a specific one of the one or more object items included in the object item list via the user input unit 130 (S270). The mobile terminal 100 can then display on the display module 151 the object indicator for the selected specific object item at a point on a preview image corresponding to the object represented by the selected specific object item (S280).

In one embodiment, the preview image can include at least an image currently input via the camera 121, a virtual image corresponding to current terminal position information received from an external server or previously stored in the mobile terminal 100, or a map image based on a current position of the mobile terminal 100 obtained from terminal position information.

Figure 8A:
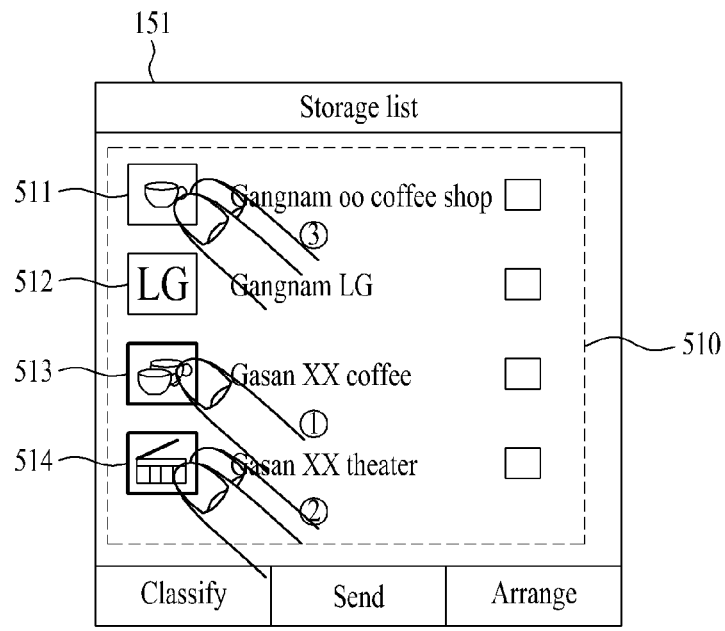
FIGS. 8A and 8B are exemplary display screens of the display module showing an operation of the mobile terminal for receiving a touch input provided by a user on an object item in accordance with one embodiment of the present invention.
Figure 8B:
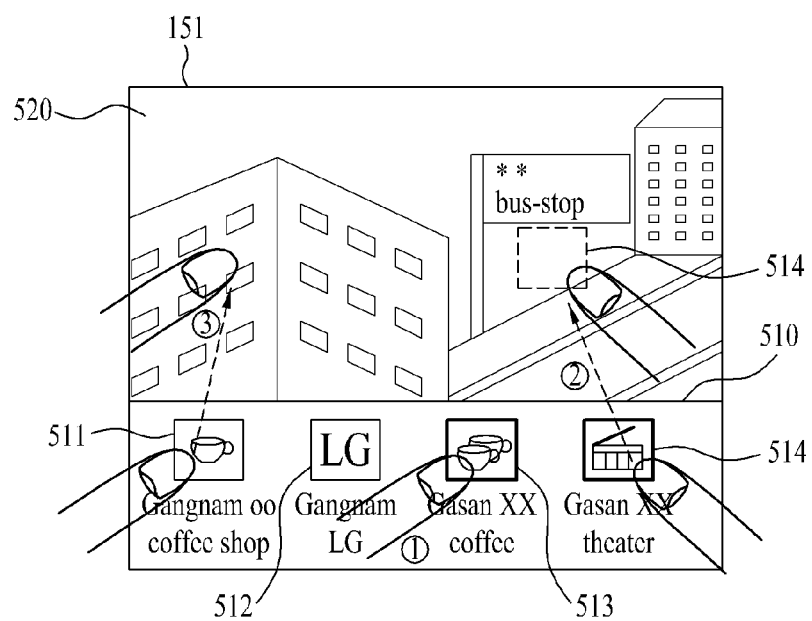

Operation S270 of FIG. 2 will now be described in detail with reference to FIGS. 8A and 8B. FIGS. 8A and 8B are exemplary display screens of the display module 151 showing an operation of the mobile terminal 100 for receiving a touch input provided by a user on an object item in accordance with one embodiment of the present invention.

FIG. 8A shows an object item list 510 including the object items 511, 512, 513 and 514 and FIG. 8B shows a preview image 520 and an object item list including the object items 511, 512, 513 and 514. In the following description, a specific object item is selected via a touch input. It should be understood, however, that a specific object item can be selected in various ways other than a touch input Referring to FIG. 8A, the mobile terminal 100 can receive a first single touch input on a third object item 513 for commanding the display of object related information corresponding to the third object item 513 or receive a second single touch input on a third object item 513 for commanding the display of an object indicator corresponding to the third object item 513.

The first single touch input and the second single touch input can be differentiated in various ways, such as a touch duration, a touch pressure, or a touch area. For example, the first single touch input can be a touch input performed for a duration of one second, whereas the second single touch input can be a touch input performed for a duration of two seconds.

The mobile terminal 100 can receive an input of a multi-touch input or a number of touch inputs for commanding the display of an object indicator of an object represented by a first object item 511 or a fourth object item 514 selected from the display module 151, or object indicators of objects that are within a distance from the mobile terminal 100 to the object represented by the first object item 511 or the fourth object item 514.

Referring to FIG. 8B, the mobile terminal 100 can receive a first or second single touch input on the third object item 513 as previously described with respect to FIG. 8A. In one embodiment, a touch and drag input from the third object item 513 to a point on the preview image 520 can be used instead of the second single touch input.

The mobile terminal 100 can receive a touch and drag input from the first object item 511 or the fourth object item 514 to a point on the preview image 520. The touch and drag input can command the display of an object indicator of an object represented by the selected first object item 511 or the fourth object item 514, or object indicators of objects within a distance from the mobile terminal 100 to the object represented by the first object item 511 or the fourth object item 514.

Figure 9A:
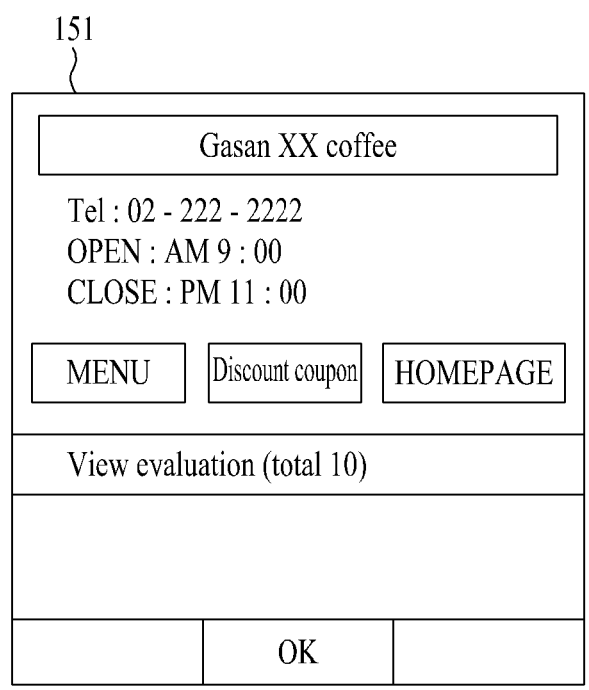
FIGS. 9A through 9C are exemplary display screens of the display module showing an operation of the mobile terminal for displaying an object indicator or object related information corresponding to a selected object item in accordance with various embodiments of the present invention.
Figure 9B:
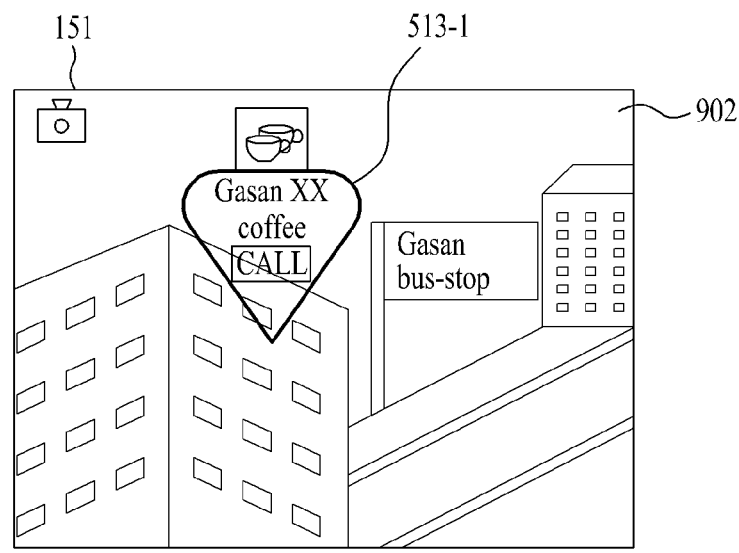
Figure 9C:
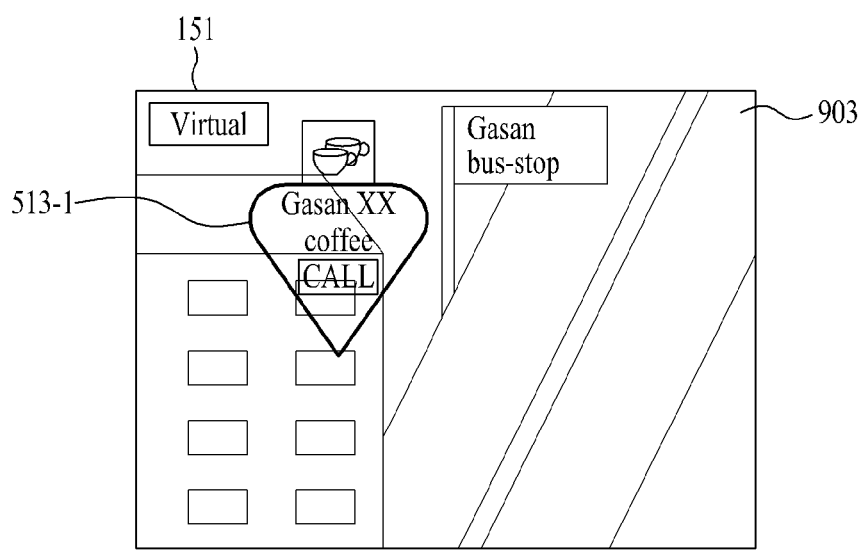

Operation S280 of FIG. 2 will now be described in detail with reference to FIGS. 9A through 11D. FIGS. 9A through 9C are exemplary display screens of the display module 151 showing an operation of the mobile terminal 100 for displaying an object indicator or object related information corresponding to a selected object item in accordance with various embodiments of the present invention.

In particular, FIG. 9A shows an exemplary display screen that results when the first single touch input is provided on the third object item 513 in FIG. 8A or 8B. FIGS. 9B and 9C show exemplary display screens that result when the second single touch input is provided on the third object item 513 in FIG. 8A or 8B.

Referring to FIG. 9A, when the first single touch input on the third object item 513 in FIG. 8A or 8B is received, the mobile terminal 100 can display object related information corresponding to the third object item 513 on the display module 151. The mobile terminal 100 can display the object related information stored in the memory 160, or the object related information obtained by accessing a Web site using a Web address in the object related information stored in the memory 160.

Referring to FIG. 9B, when the second single touch input on the third object item 513 in FIG. 8A or 8B is received, the mobile terminal 100 can display an object indicator 513-1 corresponding to the third object item 513 on a preview image 902 currently input via the camera 121 if an object represented by the third object item 513 is located at the current position of the mobile terminal 100. If an object represented by the third object item 513 is not located at the current position of the mobile terminal 100, the mobile terminal 100 can display an object indicator 513-1 corresponding to the third object item 513 on a virtual image 903 as shown in FIG. 9C.

For example, the object indicator 513-1 can be displayed at a point corresponding to the object represented by the third object item 513 on the preview image or virtual image. In one embodiment, the virtual image can be a virtual preview image corresponding to the current position of the mobile terminal 100. For example, the virtual image can be stored in the memory 160 or can be received from an external server.

When a selection action on the object item 513 or on an object icon in FIG. 8B is received by the mobile terminal 100 in addition to a selection of a specific point on the background image, the mobile terminal 100 can first display the object indicator 513-1 corresponding to the object item 513 at the specific point, check a located point of an object represented by the object item 513 within the background image, and display the object indicator 513-1 at the located point of the corresponding object by shifting the object indicator 513-1 from the specific point to the located point.

For example, the selection action on the object item 513 or on the object icon, and the selection action on the specific point on the background image can include a touch input on the object item 513 and a touch input on the specific point. Alternatively, the selection action on the object item 513 or on the object icon, and the selection action on the specific point on the background image can include a touch and drag input from the object item 513 to the specific point.

Figure 10A:
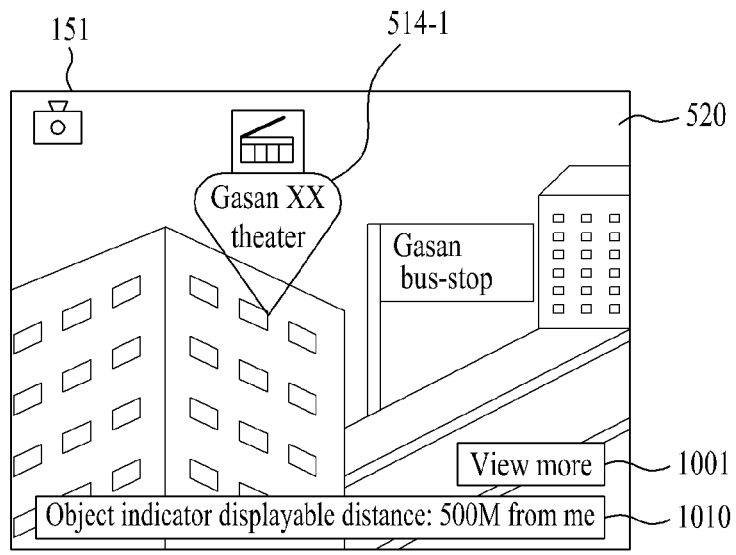
FIGS. 10A and 10B are exemplary display screens of the display module showing an operation of the mobile terminal for displaying an object indicator corresponding to a selected object item, or for displaying object indicators corresponding to objects that are within a distance of the selected object item in accordance with various embodiments of the present invention.
Figure 10B:
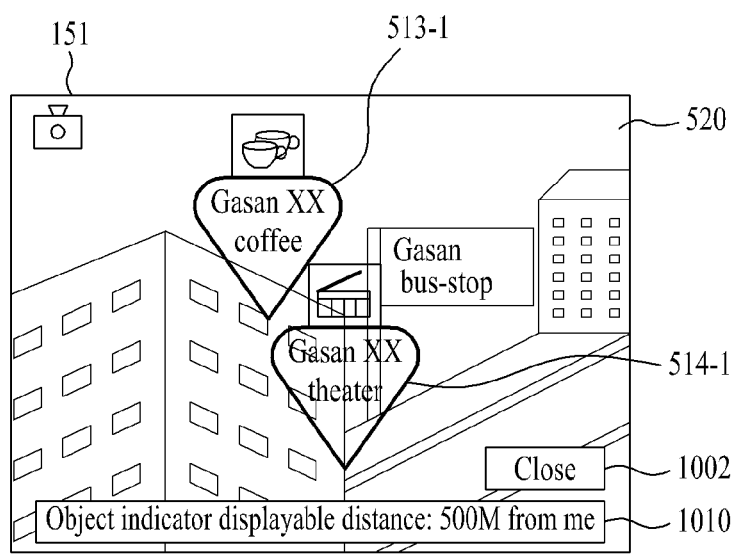

FIGS. 10A and 10B are exemplary display screens of the display module 151 showing an operation of the mobile terminal 100 for displaying an object indicator corresponding to a selected object item, or for displaying object indicators corresponding to objects that are within a distance of the selected object item in accordance with various embodiments of the present invention. More specifically, the embodiment of FIG. 10A shows an operation of the mobile terminal 100 when a multi-touch input or a number of touch inputs on the fourth object item 514 in FIG. 8A are received. The embodiment of FIG. 10B shows an operation of the mobile terminal 100 when a touch and drag input from the fourth object item 514 to a point on the preview image 520 in FIG. 8B is received.

For ease of description, the embodiments of FIGS. 10A and 10B show object indicators corresponding to object items displayed on a preview image 520 of a real world environment currently input via the camera 121. It should be understood, however, that the preview image 520 can be a virtual image in other embodiments.

Referring to FIG. 10A, the mobile terminal 100 can set an object indicator displaying distance to the distance of an object item. The object indicator displaying distance is a distance from the current position of the mobile terminal 100, such that object indicators of all objects located within the object indicator displaying distance are displayed on the preview image 520.

For example, the object indicator displaying distance can be set to a distance of the fourth object item 514 in FIG. 10A, which can be a distance of 500 m from the mobile terminal 100. The mobile terminal 100 can then display an object indicator 514-1 corresponding to the fourth object item 514 at a point on a preview image corresponding to the object represented by the fourth object item 514.

Referring to FIG. 10B, the mobile terminal 100 can set the object indicator displaying distance, such as a distance of 500 m of the fourth object item 514, in a manner previously described with respect to FIG. 10A. The mobile terminal 100 can then display all object indicators, such as object indicators 513-1 and 514-1, of objects that are within the object indicator displaying distance on the preview image 520.

If the "View more" zone 1001 on the display module 151 in FIG. 10A is selected, the display screen shown in FIG. 10B can be displayed. If a "close" zone 1002 on the display module 151 in FIG. 10B is selected, the mobile terminal 100 can return to the display screen shown in FIG. 10A. In the embodiments of FIG. 10A or 10B, object indicator display distance information 1010 can be displayed on a prescribed region of the display screen on the display module 151.

FIGS. 11A through 11D are exemplary display screens showing an operation of the mobile terminal 100 for switching to a map image when a selected object item is located beyond a predetermined distance in accordance with various embodiments of the present invention.

In one embodiment, the object represented by the first object item 511 selected in FIG. 8A or 8B can be located outside a predetermined distance from the mobile terminal 100. For example, the first object item 511 can be selected by a selection action, which can be a multi-touch input or a number of the touch inputs as previously described with reference to FIG. 8A, or which can be a touch and drag input as previously described with respect to FIG. 8B. Alternatively, the selection action can be the previously described second single touch input.

Figure 11A:
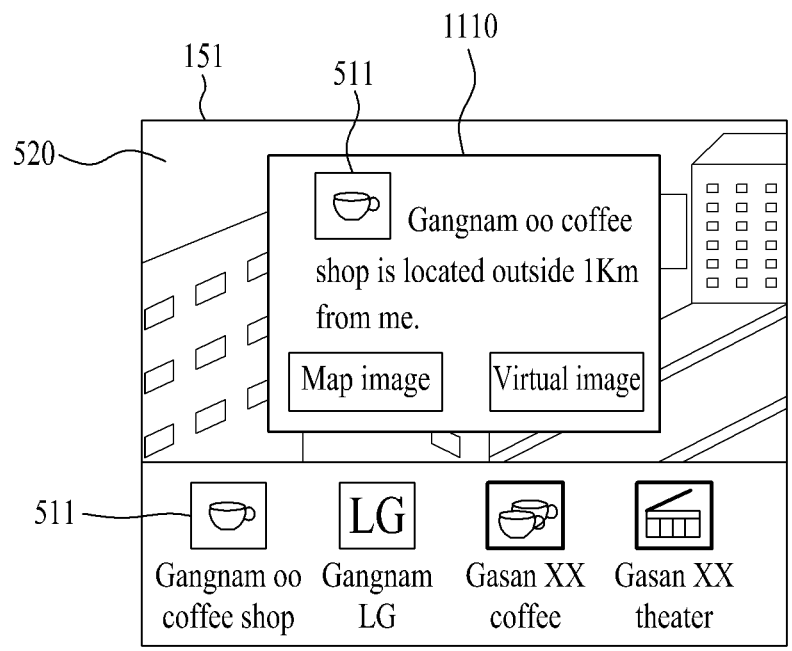
FIGS. 11A through 11D are exemplary display screens showing an operation of the mobile terminal for switching to a map image when a selected object item is located beyond a predetermined distance in accordance with various embodiments of the present invention.

Referring to FIG. 11A, if the first object item 511 selected in FIG. 8A or 8B is not located within a predetermined distance from the mobile terminal 100, such as 1 Km, the mobile terminal 100 can display a message window 1110 that can indicate the position of the first object item 511 and can enable a user to select a map image option or a virtual image option for displaying an object indicator corresponding to the first object item 511.

Figure 11B:
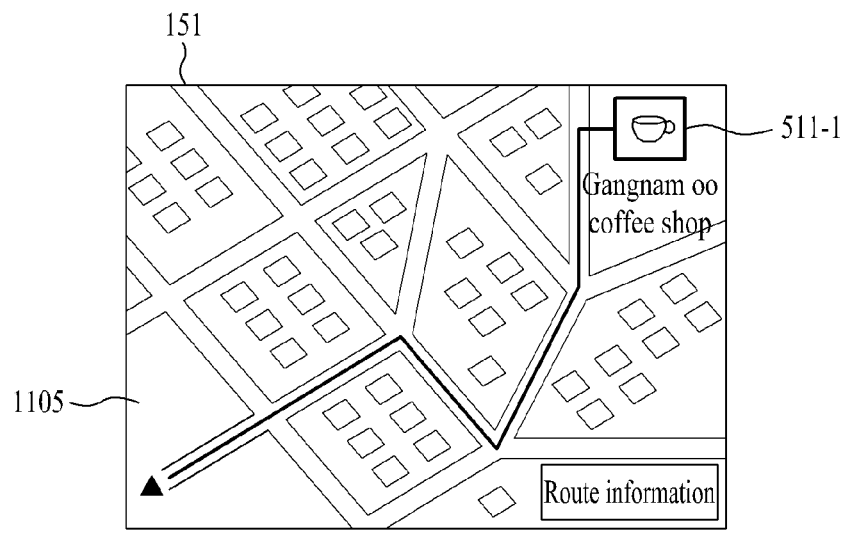

Referring to FIG. 11B, if the map image option is selected in FIG. 11A, the mobile terminal 100 can switch the displayed preview image 520 to a map image 1105 and can display an object indicator 511-1 corresponding to the first object item 511 at a point on the map image 1105 corresponding to an object represented by the first object item 511. In such a case, the map image 1105 can include a map of an area or region within a predetermined distance from the current position of the mobile terminal 100.

In one embodiment, a path to the object indicator 511-1 from the mobile terminal 100 can be further displayed on the map image 1105. In addition, object indicators corresponding to objects located within a distance from the mobile terminal 100 to the first object item 511 can be further displayed at points on the map image 1105 where the objects are located (not shown in the drawings).

Figure 11C:
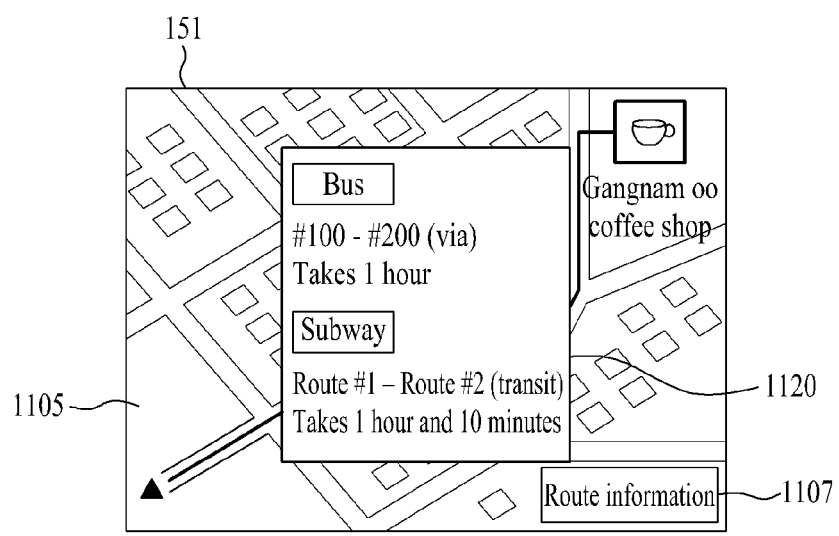

With reference to FIG. 11C, if the "Route information" zone 1107 is selected, the mobile terminal 100 can further display various transportation means that can be used to travel from a current position of the mobile terminal 100 to the object represented by the first object item 511. The transportation means can include, for example, a bus, subway, automobile, or by walking. As shown in FIG. 11C, detailed information with respect to each of the transportation means can be displayed in a message window 1120.

Figure 11D:
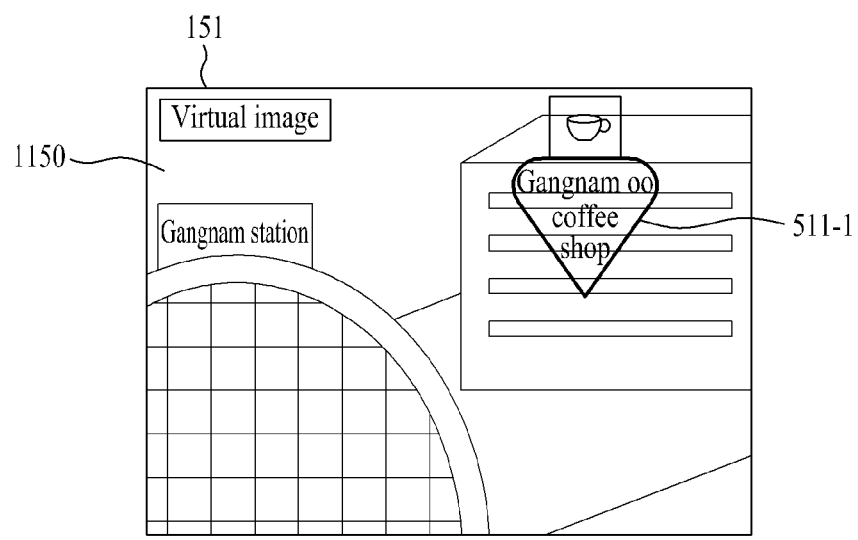

Referring to FIG. 11D, if the virtual image option is selected in FIG. 11A, the mobile terminal 100 can display a virtual image 1150 including the object indicator 511-1 and the object corresponding to the object indicator 511-1. In such a case, the virtual image 1150 can include a virtual preview image.

In one embodiment, if the mobile terminal 100 determines that the selected object item is not located within the predetermined distance from the mobile terminal 100, the mobile terminal 100 can display object indicators by switching between a map image or a virtual image without any user selection.

In one embodiment, when any previously stored object related information is determined to correspond to a current position of the mobile terminal 100, the mobile terminal 100 can output information indicating the existence of the corresponding stored object related information or update the stored object related information with reference to newly received object related information. These features will now be described with reference to FIGS. 12A through 12C.

Figure 12A:
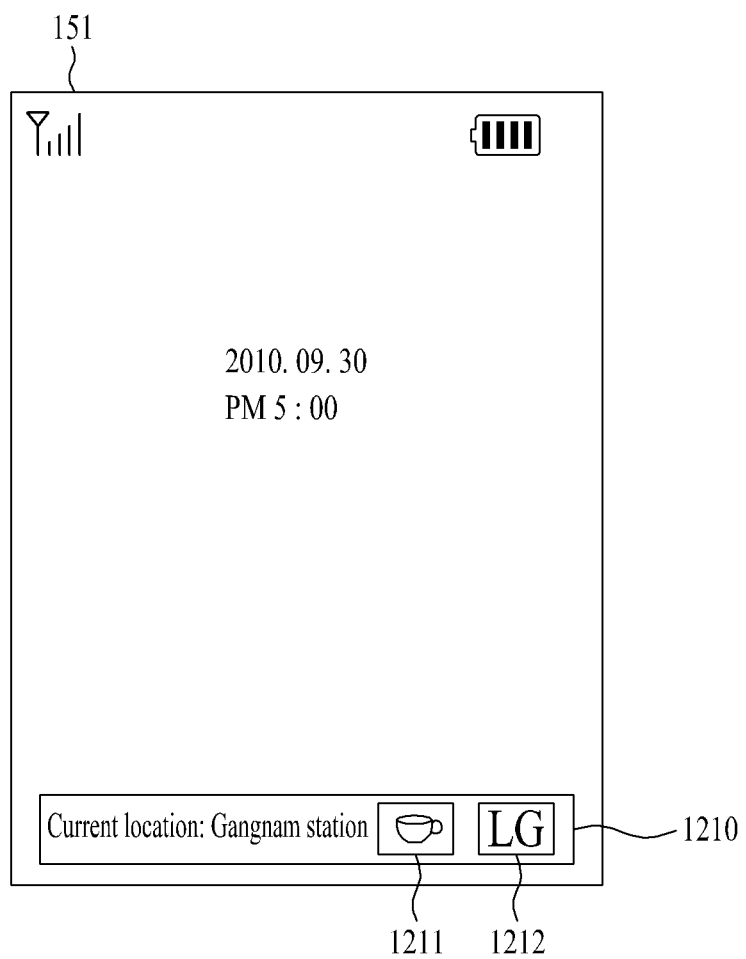
FIGS. 12A through 12C are exemplary display screens of the display module showing an operation of the mobile terminal for displaying information indicating that the stored object related information corresponds to the current position of the mobile terminal or updating the stored object related information with reference to newly received object related information in accordance with various embodiments of the present invention.
Figure 12B:
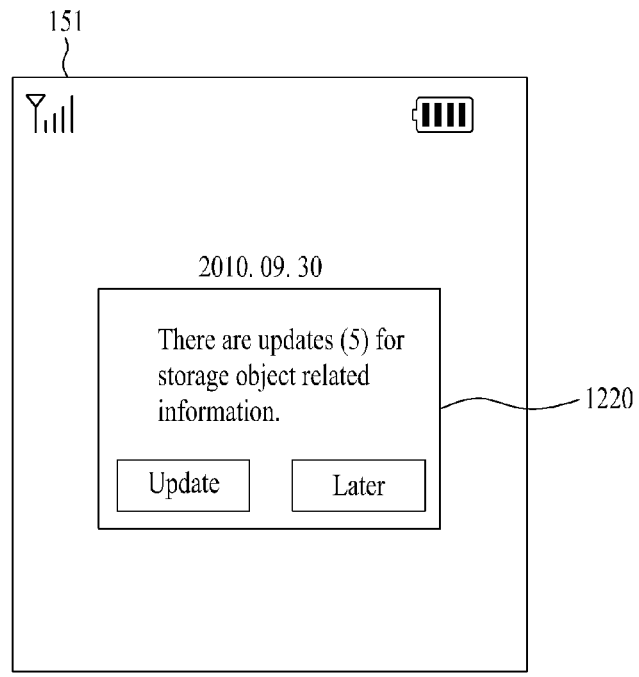
Figure 12C:
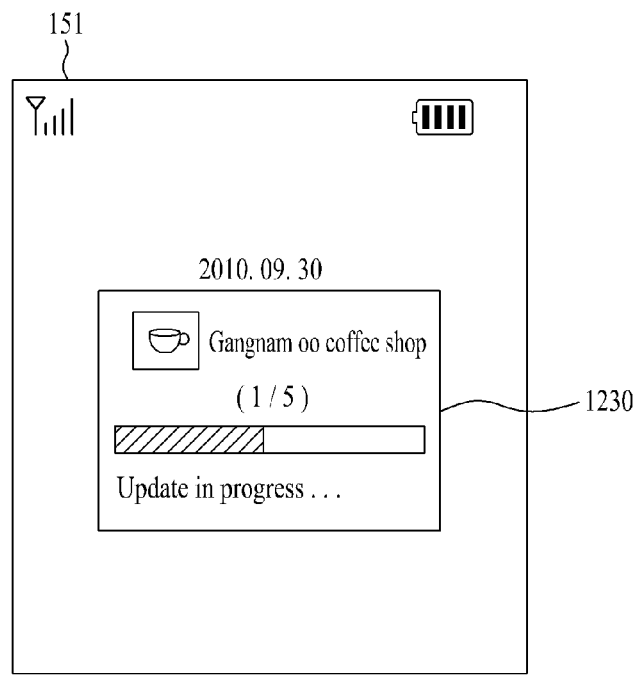

FIGS. 12A through 12C are exemplary display screens of the display module 151 showing an operation of the mobile terminal 100 for displaying information indicating that the stored object related information corresponds to the current position of the mobile terminal 100 or updating the stored object related information with reference to newly received object related information in accordance with various embodiments of the present invention.

Referring to FIG. 12A, when stored object related information is determined to correspond to a current position of the mobile terminal 100, the mobile terminal 100 can indicate the corresponding stored object related information to a user in a standby mode of the mobile terminal 100 or during operation of a specific application.

For example, the mobile terminal 100 can display object items of the stored object related information corresponding to the current position of the mobile terminal 100, such as object items 1211 and 1212 in the message window 1210. In addition to displaying the object items, the mobile terminal 100 can output a vibration, an illumination, an icon, or an image. When an input for selecting the object item 1211 or 1212 displayed in FIG. 12A is received, the mobile terminal 100 can display object related information of the selected object item or display an object indicator as previously described with respect to FIGS. 9A through 10B.

Referring to FIG. 12B, if the mobile terminal 100 needs to update previously stored object related information with reference to newly received object related information, the mobile terminal 100 can output information indicating the existence of an update target object related information in the message window 1220. For example, the output information in the message window 1220 can include a corresponding object item or the number of corresponding object items.

Referring to FIG. 12C, if a user selects the "Update" command in the message window 1220 in FIG. 12B, the mobile terminal 100 can update the previously stored object related information. As shown in FIG. 12C, the mobile terminal 100 can display an indication window 1230 for indicating a progress status of the update and identity information of the update target object related information. For example, the identity information can be a name, a representative image, or a representative icon.

In one embodiment, the mobile terminal 100 can automatically update the update target object related information notwithstanding whether a user selection is received. Moreover, the mobile terminal 100 can receive an editing action input on the stored object related information from a user and can update the stored object related information according to the editing action.

For example, the editing action can include either an action to modify or replace a representative image or icon included in the object related information, an action to modify or replace a telephone number or a Web site address, or an action to modify or replace a name.

The mobile terminal 100 can transmit the stored object related information to at least one counterpart terminal or receive object related information from at least one counterpart terminal. The management of object related information in the mobile terminal 100 by transmission or reception of object related information will now be described with reference to FIGS. 13 through 19C.

Figure 13:
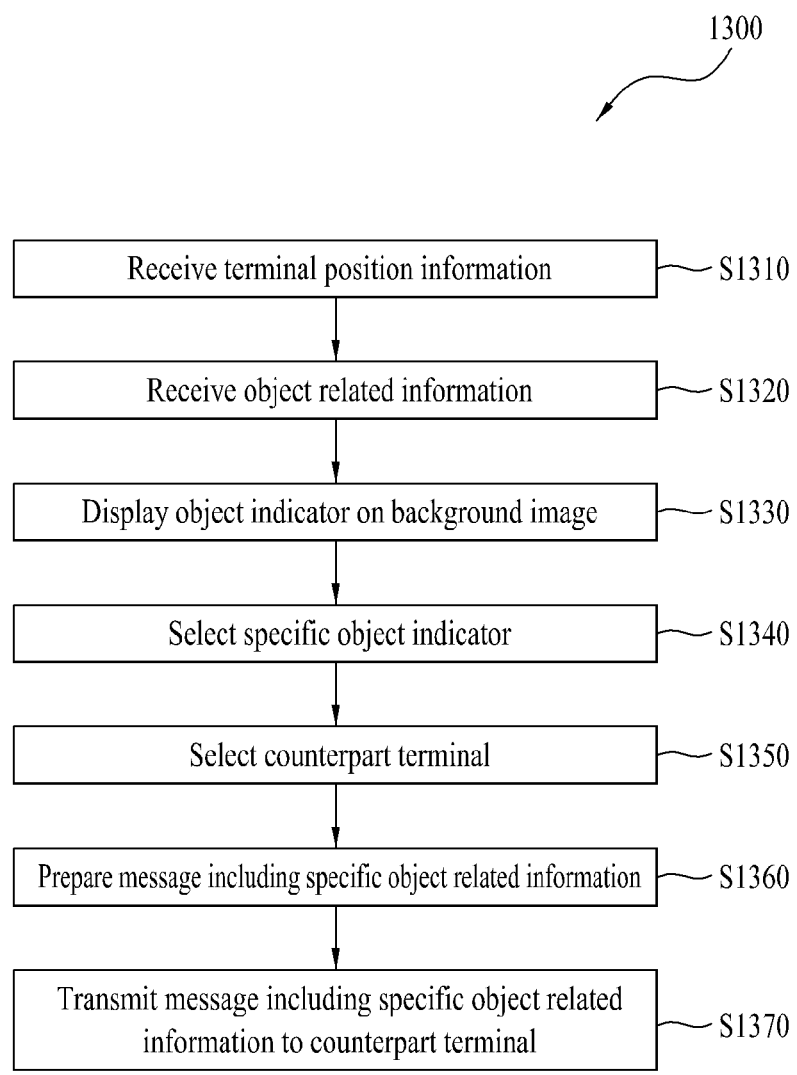
FIG. 13 is a flowchart illustrating a method for managing object related information in the mobile terminal in accordance with one embodiment of the present invention.

FIG. 13 is a flowchart 1300 illustrating a method for managing object related information in the mobile terminal 100 in accordance with one embodiment of the present invention.

Referring to FIG. 13, the mobile terminal 100 can receive terminal position information of the mobile terminal 100 (S1310) and object related information (S1320) using the wireless communication unit 110, and can display at least one object indicator on the display module 151 representing at least one object on a background image (S1330).

For example, operations S1310 through S1330 can be performed in a manner as previously described with respect to corresponding operations S210 through S230 in flowchart 200 of FIG. 2. Therefore, the details of operations S1310 through S1330 will not be described to maintain brevity.

With respect to operation S1330, the mobile terminal 100 can further display a transmission target object indicator region while displaying the background image and the object indicator. For example, the transmission target object indicator region can be a region for displaying an identifier corresponding to an object indicator selected by a user for sending object related information of the object indicator. Therefore, the user can intuitively check which object indicator is a transmission target.

The transmission target object indicator region can be displayed if a transmission command of the object related information is input by a user. Alternatively, the transmission target object indicator region can be displayed in a default mode notwithstanding any user commands received by the mobile terminal 100.

The mobile terminal 100 can receive an input for selecting a specific object indicator corresponding to the object related information (S1340), which is to be transmitted to a counterpart terminal. For example, the specific object indicator can be selected from one or more object indicators displayed in operation S1330 via the user input unit 130. The mobile terminal 100 can display an identifier corresponding to the selected specific object indicator within the displayed transmission target object indicator region.

Operation S1340 can be performed when the mobile terminal 100 enters a transmission standby mode or enters a selection mode for selecting the transmission target object related information. For example, the transmission standby mode and the selection mode can be entered if a corresponding key zone or a corresponding menu item of the mobile terminal 100 is selected.

In operation S1340, a specific object indicator can be selected from one or more object indicators corresponding to a current position of the mobile terminal 100 or from one or more object indicators corresponding to a specific position designated by a user.

For example, a specific object indicator can be selected from object indicators displayed on a preview image, or from object indicators displayed on a virtual preview image or a map image corresponding to a specific location designated by a user. In one embodiment, the virtual preview image or the map image does not correspond to a current position of the mobile terminal 100.

In operation S1340, the mobile terminal 100 can select a specific object item from one or more object items corresponding to one or more object related information stored in the memory 160. Therefore, object related information corresponding to the specific object item can be included in a transmitted message. Moreover, in operation S1340, the mobile terminal 100 can automatically select an object indicator that satisfies a prescribed condition without receiving a selection of an object indicator from a user. In such a case, the prescribed condition can be set or selected by a user.

For example, the mobile terminal 100 can select an object indicator that falls within a specific category, such as a restaurant, mart, department store, or bookstore. Alternatively, the mobile terminal 100 can select an object indicator located at a specific point. For example, the specific point can be within a predetermined distance from the current position of the mobile terminal 100 or within a predetermined distance from an object corresponding to a specific object indicator.

Figure 14A:
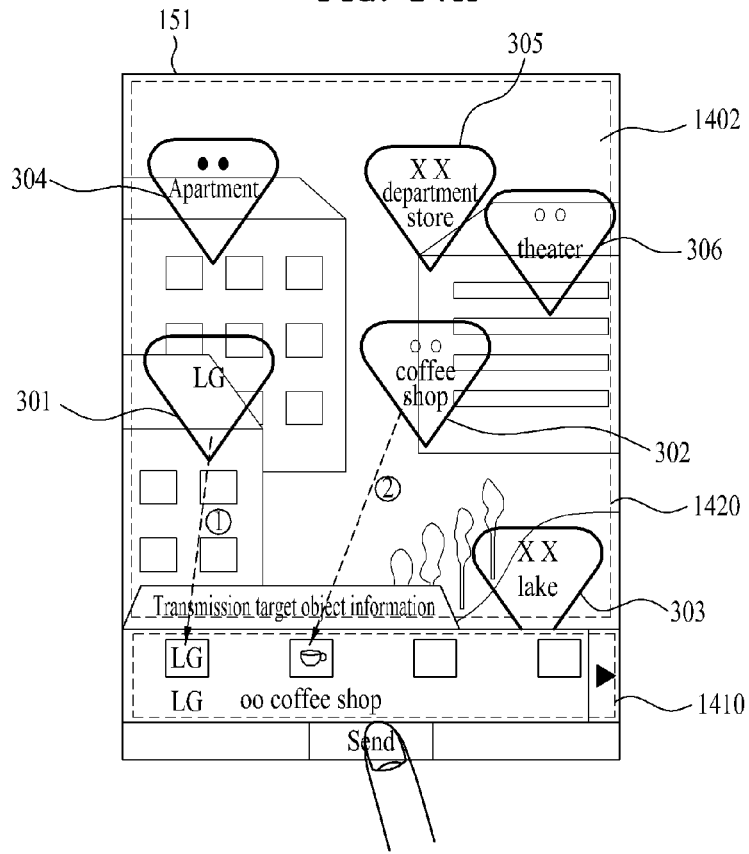
FIGS. 14A and 14B are exemplary display screens of the display module showing an operation of the mobile terminal 100 for selecting a transmission target object related information in accordance with various embodiments of the present invention.
Figure 14B:
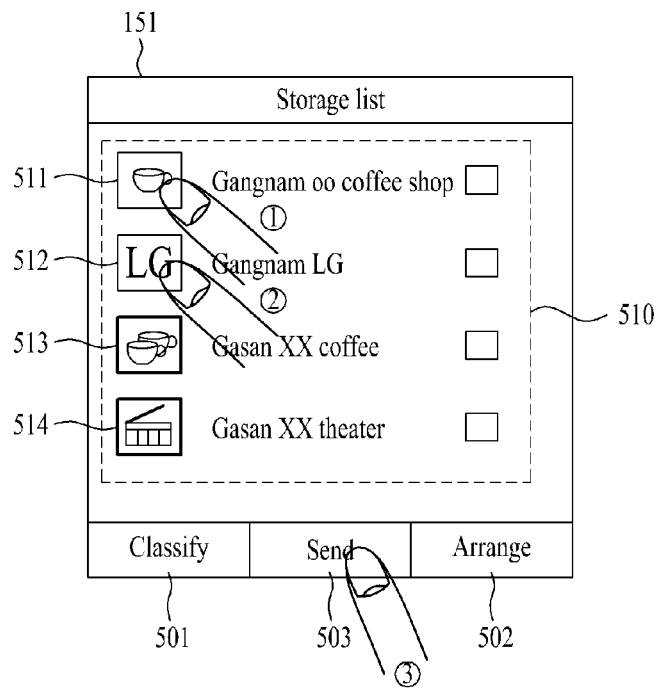

Operation S1340 will now be described with reference to FIGS. 14A and 14B. FIGS. 14A and 14B are exemplary display screens of the display module 151 showing an operation of the mobile terminal 100 for selecting a transmission target object related information in accordance with various embodiments of the present invention.

Referring to FIG. 14A, when the mobile terminal 100 displays a number of object indicators, such as object indicators 301 through 306, on a preview image 1402 on the display module 151 and when a command for transmitting an object indicator via a message is received from a user, the mobile terminal 100 can partition the displayed screen into a number of regions, such as first region 1410 and second region 1420. The mobile terminal 100 can display a transmission target object indicator region in the first region 1410, and display a preview image 1402 including an object indicator in the second region 1420. In one embodiment, the preview image displayed on the entire display region and the transmission target object indicator region can be displayed in an overlapping manner.

The command for transmitting the object indicator via the message can be input by a selection of a corresponding menu item, or a selection of a corresponding key or a corresponding key zone displayed on the display module 151. For example, the command can be input by selecting the "send" command in FIG. 3B.

In FIG. 14A, when a touch and drag input is performed from a first object indicator 301 to the transmission target object indicator region 1410 and a touch and drag input is performed from a second object indicator 302 to the transmission target object indicator region 1410, the mobile terminal 100 can display a first identifier corresponding to the first object indicator 301 and a second identifier corresponding to the second object indicator 302 in the transmission target object indicator region 1410. The mobile terminal 100 can then set transmission target object related information to the first and second object related information corresponding to the first and second object indicators 301 and 302.

When a touch input on the first object indicator 301, a touch input on the second object indicator 302, and a touch input on the transmission target object indicator region are received by the mobile terminal 100, the mobile terminal 100 can set the transmission target object related information to the first and second object related information. In doing so, the mobile terminal 100 includes the transmission target object indicator region provided within a prescribed region on the display screen and can then display the first and second identifiers in the transmission target object indicator region.

Referring to FIG. 14B, when an object item list 510 including a number of exemplary object items 511 through 514 of which object related information are stored in the memory 160 is displayed by the mobile terminal 100, the mobile terminal 100 can receive a selection input, such as a touch input, on each of the first and second object items 511 and 512.

Subsequently, the mobile terminal 100 can set the transmission target object related information to the first and second object related information corresponding to the first and second object items 511 and 512 selected by the touch inputs.

Referring now to FIG. 13, the mobile terminal 100 can receive an input via the user input unit 130 for selecting one or more counterpart terminals that will receive the object related information corresponding to the object indicator selected in operation S1340 (S1350).

Although FIG. 13 shows that the selection of the counterpart terminal is performed after the selection of the object indicator, it should be understood that the selection of the object indicator can be performed after the selection of the counterpart terminal. In one embodiment, both the selection of the counterpart terminal and the selection of the object indicator can be performed in a substantially concurrent manner.

In operation S1350, the mobile terminal 100 can receive a selection of a counterpart terminal from a user or automatically select a counterpart terminal that satisfies a predetermined condition. In the latter case, an action by a user for selecting a counterpart terminal may be unnecessary, unless the user is given the option to select counterpart terminals satisfying the predetermined condition from a number of counterpart terminals.

For example, the predetermined condition can be a counterpart terminal located within a predetermined distance from the mobile terminal 100 or a counterpart terminal located at a position specified by a user of the mobile terminal 100.

In operation S1350, if the mobile terminal 100 is performing a speech or video call with a specific counterpart terminal or is communicating with a specific counterpart terminal via Instant Messaging Service (IMS), the mobile terminal 100 can select the specific counterpart terminal as a recipient of object related information.

Operation S1350 will now be explained in detail with reference to FIGS. 15A through 15F. FIGS. 15A through 15F are exemplary display screens of the display module 151 showing an operation of the mobile terminal 100 for selecting a counterpart terminal as a recipient of object related information in accordance with various embodiments of the present invention.

Figure 15A:
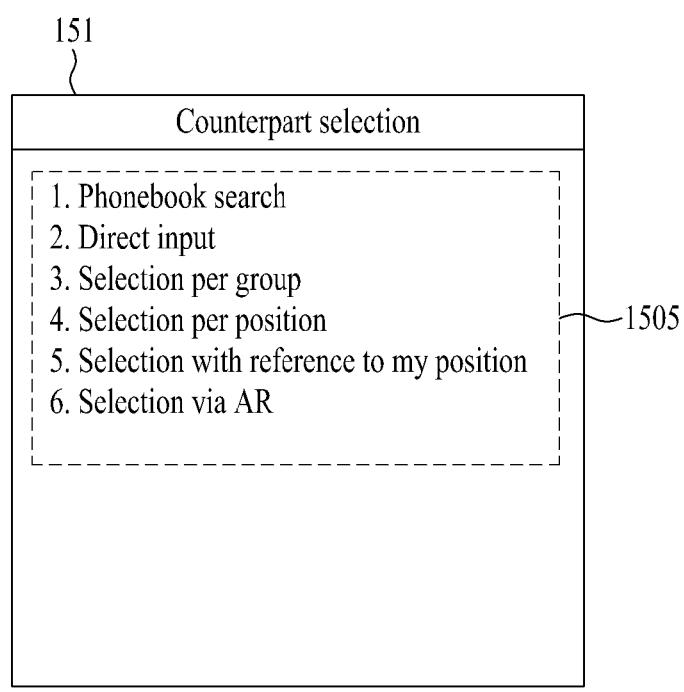
FIGS. 15A through 15F are exemplary display screens of the display module showing an operation of the mobile terminal for selecting a counterpart terminal as a recipient of object related information in accordance with various embodiments of the present invention.

Referring to FIG. 15A, the mobile terminal 100 can display a list 1505 of menu items related to selecting a counterpart terminal on the display module 151. For example, if the "Phonebook search" menu item is selected from the list 1505, the mobile terminal 100 provides a user with various counterpart terminal information items associated with a phonebook and can select a counterpart terminal corresponding to the counterpart terminal information selected by the user.

As another example, if the "Direct input" menu item is selected from the list 1505, the mobile terminal 100 can select a counterpart terminal corresponding to counterpart terminal information directly input by the user. As another example, if the "Selection per group" menu item is selected from the list 1505, a specific group is selected from one or more groups and the mobile terminal 100 can select one or more counterpart terminals included in the selected specific group.

Figure 15B:
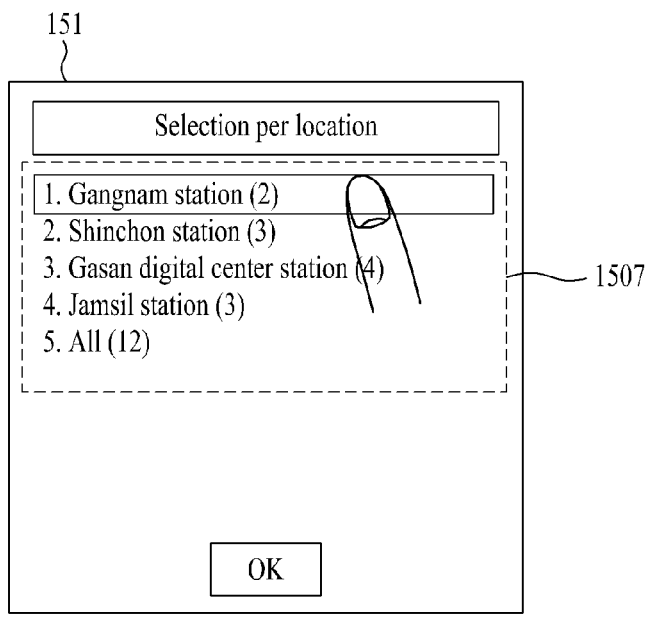

FIG. 15B shows an exemplary display screen that can be displayed on the display module 151 when the "Selection per position" menu item is selected from the list 1505.

Figure 15C:
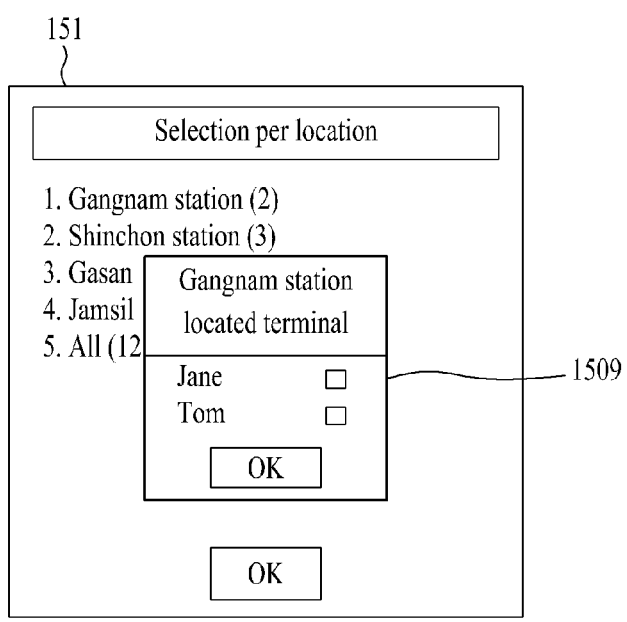

Referring to FIG. 15B, if a specific position is selected from the location list 1507, such as "Gangnam station," the mobile terminal 100 can be used to select one or more counterpart terminals that are located at the specific position, as shown in FIG. 15C. In the embodiment of FIG. 15C, the one or more counterpart terminals located at the specific position are referenced by a name of a user of a corresponding counterpart terminal, such as "Jane" or "Tom," in the message window 1509.

For example, the location list 1507 can include positions previously designated by a user, positions visited by a user based on a predetermined number of visits to the position, current positions of counterpart terminals that have agreed to share object indicators with the mobile terminal 100, current positions of counterpart terminals previously designated by a user, or current positions of counterpart terminals that are registered with a phonebook.

As shown in FIG. 15C, the number of counterpart terminals that are located at each corresponding position in the location list 1507 can be indicated by displaying a numeral in parentheses next to the corresponding position. In other embodiments, identity information, such as a name or a phone number, of counterpart terminals can be provided next to each corresponding position in the location list 1507.

Figure 15D:
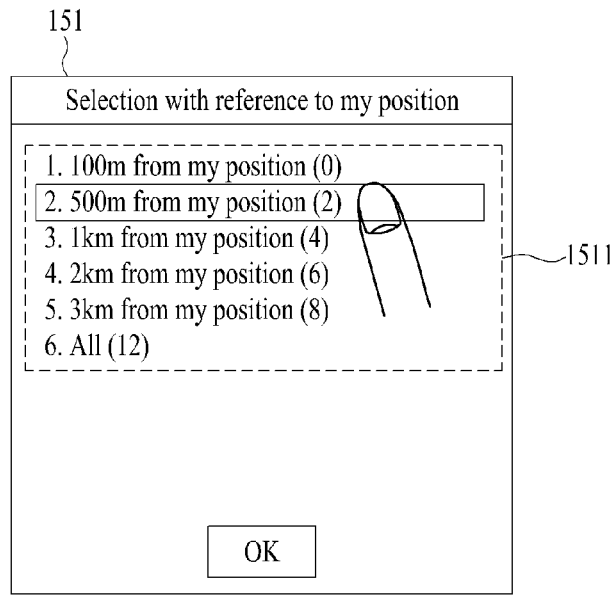

FIG. 15D is an exemplary display screen that can be displayed on the display module 151 when the "Selection with reference to my position" menu item is selected from the list 1505.

Figure 15E:
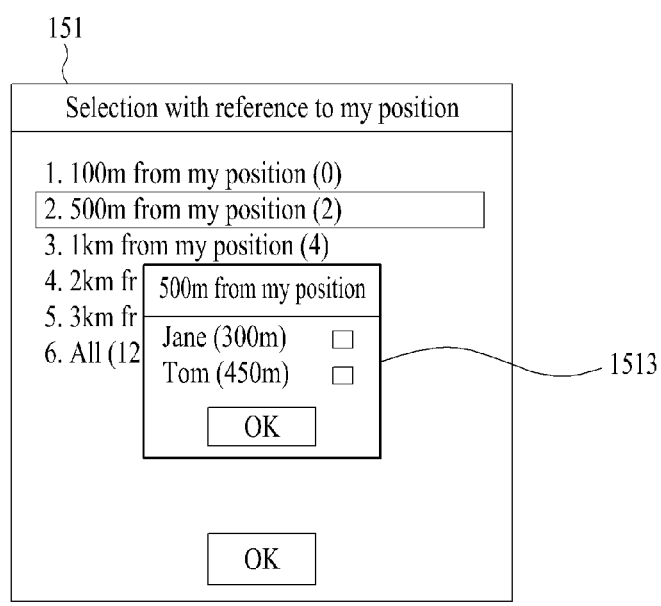

As shown in FIG. 15D, the mobile terminal 100 can be configured to display the distance list 1511 including various distances from the mobile terminal 100, such as "100 m from my position," "500 m from my position," "1 km from my position" and "2 km from my position." If a specific reference distance is selected from the distance list 1511, such as "500 m from my position," the mobile terminal 100 can select one or more counterpart terminals that are within the specific reference distance, as shown in FIG. 15E.

In the embodiment of FIG. 15E, the one or more counterpart terminals located within the specific reference distance are referenced by a name of a user of a corresponding counterpart terminal, such as "Jane" and "Tom," in the message window 1513. For example, the reference distance can be set by a user of the mobile terminal 100 or randomly set by the controller 180.

As shown in FIG. 15E, the number of counterpart terminals that are located within a corresponding distance in the distance list 1511 can be indicated by displaying a numeral in parentheses next to the corresponding reference distance. In other embodiments, identity information, such as a name or a phone number, of counterpart terminals can be provided next to each corresponding reference distance in the distance list 1511.

Figure 15F:
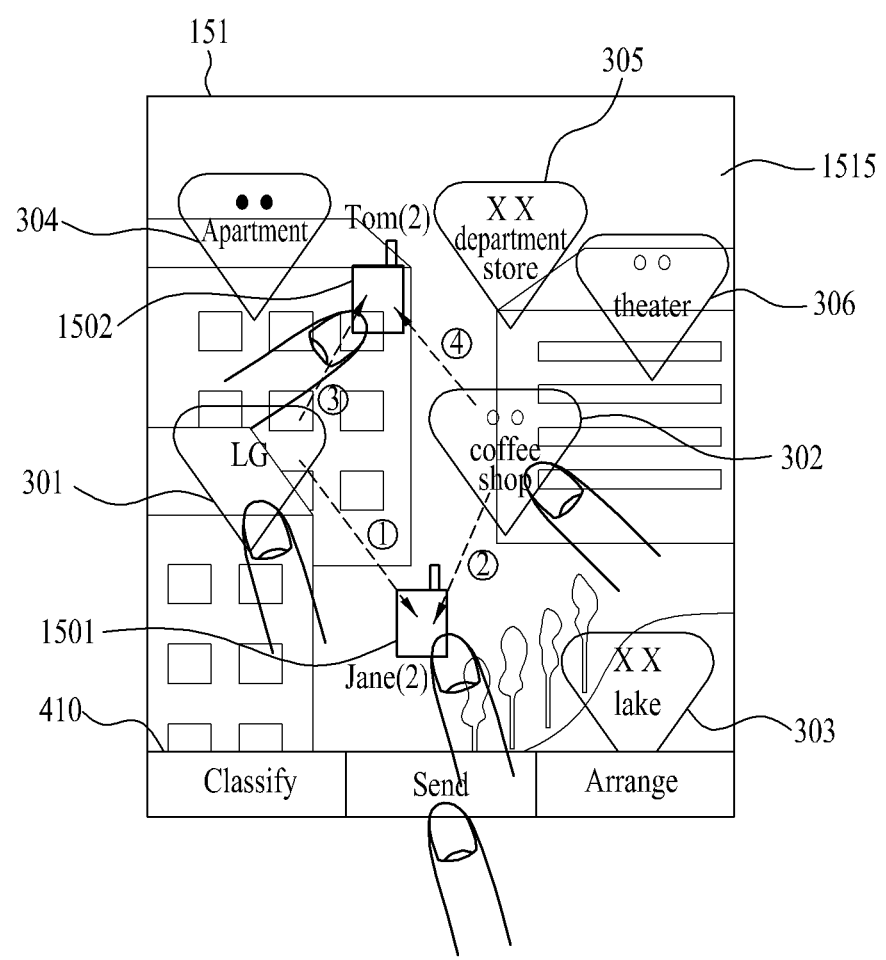

FIG. 15F is an exemplary display screen that can be displayed on the display module 151 when the "Selection via AR" menu item is selected from the list 1505. In particular, FIG. 15F shows the substantially concurrent selection of both an object indicator and a counterpart terminal.

Referring to FIG. 15F, the mobile terminal 100 can display a number of object indicators, such as object indicators 301 through 306, and a number of counterpart terminal indicators, such as counterpart terminal indicators 1501 and 1502, on the preview image 1515. As shown in FIG. 15F, for example, the mobile terminal 100 can obtain position information of the counterpart terminals corresponding to the counterpart terminal indicators 1501 and 1502 and can display the counterpart terminal indicators 1501 and 1502 at the positions corresponding to the obtained position information on the preview image 1515.

As shown in FIG. 15F, the mobile terminal 100 can be configured to receive a touch and drag input from the first object indicator 301 to the counterpart terminal indicator 1501 and a touch and drag input from the second object indicator 302 to the counterpart terminal indicator 1502. Alternatively, the mobile terminal 100 can be configured to receive a touch input on the first object indicator 301 and the counterpart terminal indicator 1501 and a touch input on the second object indicator 302 and the counterpart terminal indicator 1502.

The mobile terminal 100 can then set the transmission target object related information to first and second object related information corresponding to the first and second object indicators 301 and 302. The mobile terminal 100 can be further configured to select the counterpart terminals corresponding to the counterpart terminal indicators 1501 and 1502 as the recipients of the corresponding first and second object related information.

Referring now to FIG. 13, the mobile terminal 100 can prepare a message that includes the specific object related information corresponding to the specific object indicator selected in operation S1340 (S1360). For example, the intended recipient of the message can be the counterpart mobile terminal selected in operation S1350.

For example, the message can utilize a transmission scheme which allows the attachment of data to the message, such as a multimedia messaging service (MMS) message, an email message or an IMS message. It should be understood that the type of message is not limited to the examples disclosed herein.

In operation S1360, the mobile terminal 100 can attach the specific object related information, which can be in the form of a file or data format, to the message prepared by the mobile terminal 100. Alternatively, the specific object related information can be included in the content of the message prepared by the mobile terminal 100.

In operation S1360, the mobile terminal 100 can include all or some of the specific object related information corresponding to the selected specific object indicator in the message prepared by the mobile terminal 100. For example, only a phone number, Web site address information of a specific object, or identity information, such as a name, representative image, or representative icon, from the specific object related information corresponding to the selected specific object indicator can be included in the message.

In operation S1360, the mobile terminal 100 can include a background image and the specific object related information corresponding to the selected specific object indicator in the message prepared by the mobile terminal 100. For example, the background image can be the background image on which the specific object indicator is displayed.

In one embodiment, when the specific object indicator displayed on the background image is selected, the background image included in the message prepared by the mobile terminal 100 can include a preview or map image at the time the specific object indicator is selected. In another embodiment, when a specific object item is selected, the background image can include a preview or map image previously displayed when the object related information corresponding to the specific object item was stored by the mobile terminal 100.

When the background image is included in the message prepared by the mobile terminal 100, an object indicator corresponding to a transmission target object related information can be included separately with respect to the background image. Alternatively, the object indicator corresponding to the transmission target object related information can be included in the message and mapped to the background image.

Operation S1360 will now be described with reference to FIGS. 16A through 16C as follows.

Figure 16A:
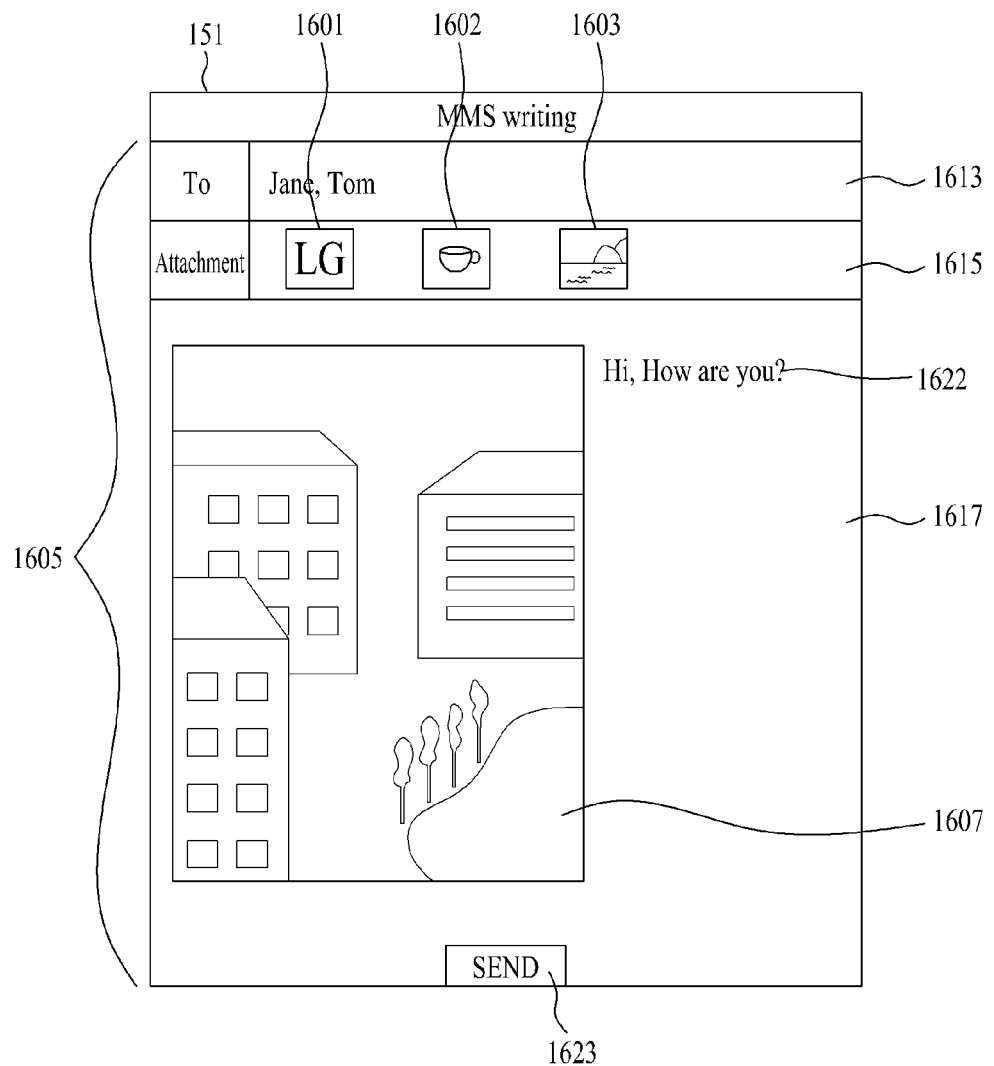
FIGS. 16A through 16C are exemplary display screens of the display module showing an operation of the mobile terminal for preparing messages that include object related information in accordance with various embodiments of the present invention.
Figure 16B:
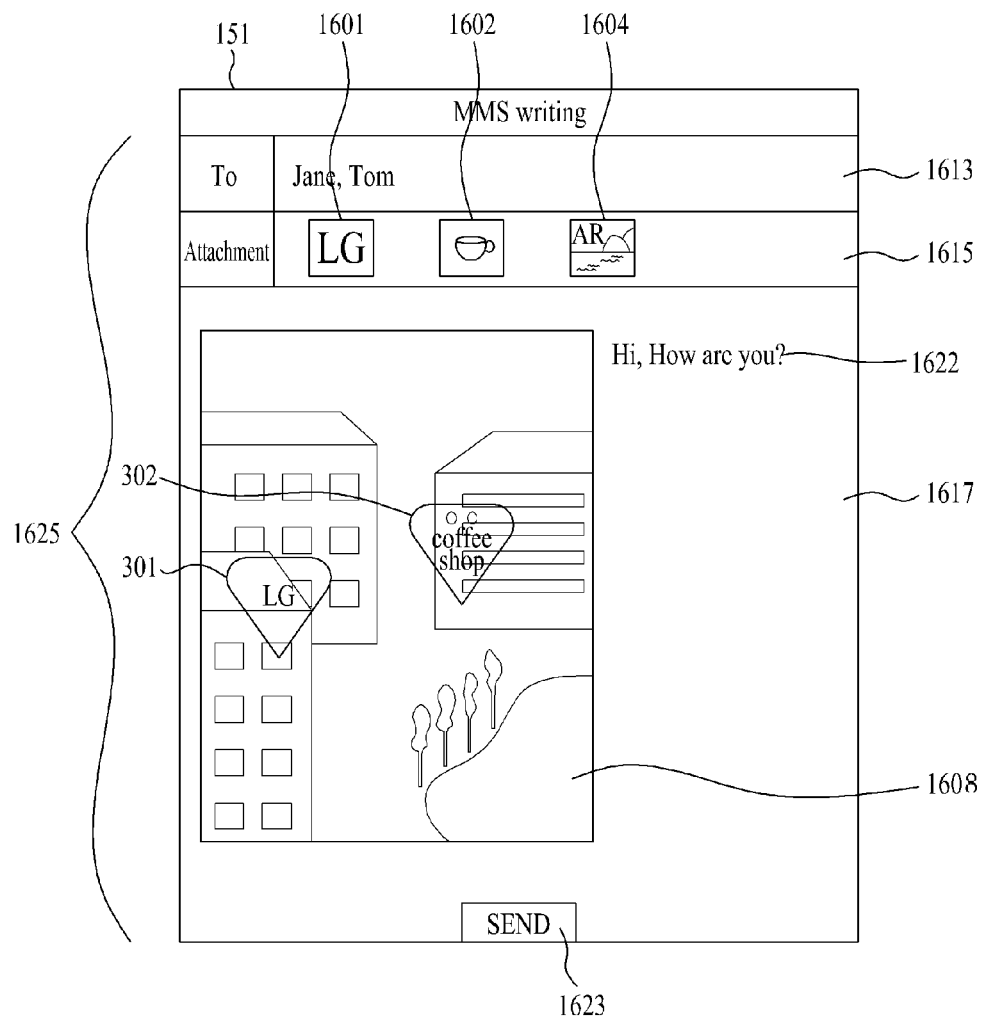
Figure 16C:
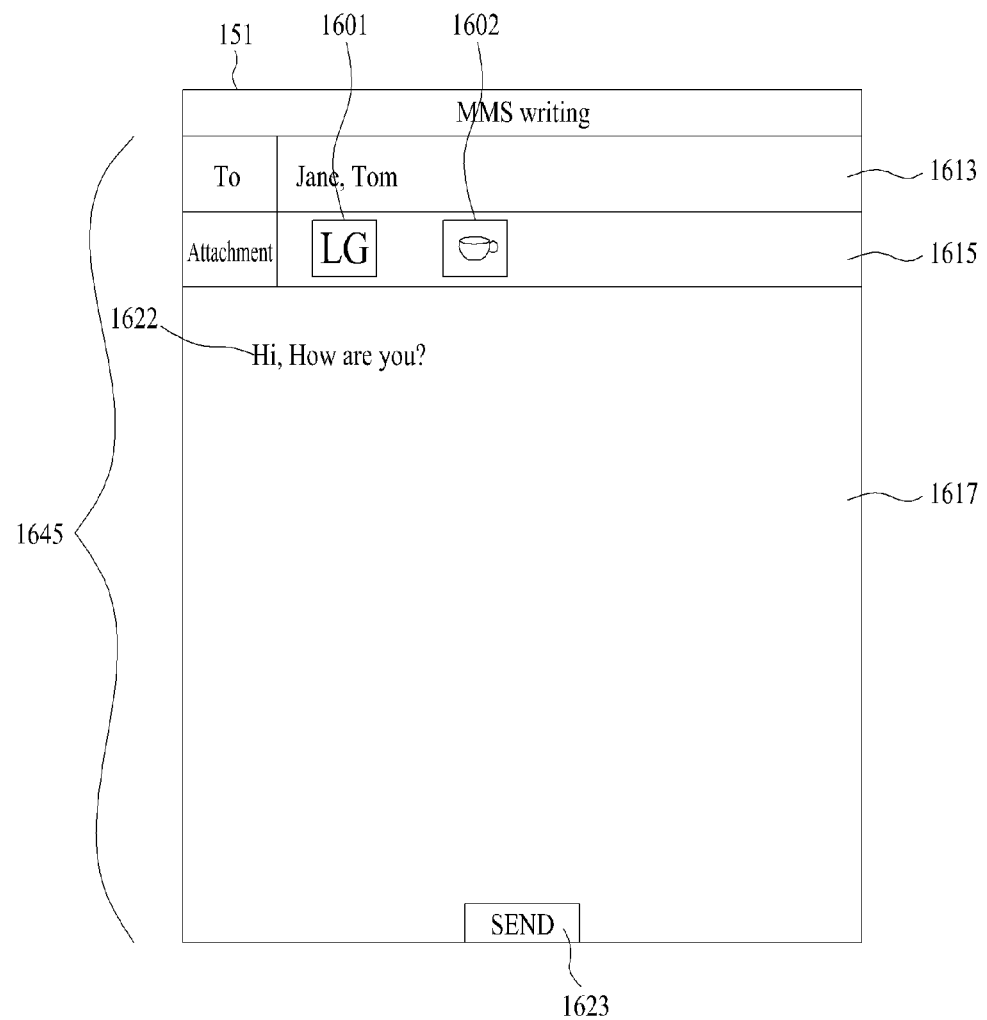

FIGS. 16A through 16C are exemplary display screens of the display module 151 showing an operation of the mobile terminal 100 for preparing messages that include object related information in accordance with various embodiments of the present invention. For ease of description, in the embodiments of FIGS. 16A through 16C, the transmission target object related information includes first object related information and second object related information, and the counterpart mobile terminals designated as "Jane" and "Tom" are the exemplary intended recipients of the object related information.

Referring to FIG. 16A, the mobile terminal 100 can prepare a message that includes first object related information, second object related information and a background image on which object indicators corresponding to the first and second object related information were displayed.

As shown in FIG. 16A, for example, the mobile terminal 100 can prepare the message 1605 by displaying the counterpart terminals identified as "Jane" and "Tom" in the field 1613 for identifying the intended recipients of the message 1605. The mobile terminal 100 can further display attachment announcement indicators for identifying files attached to the message 1605 in the field 1615, such as the attachment announcement indicator 1601 of the first object related information, the attachment announcement indicator 1602 of the second object related information and the attachment announcement indicator 1603 of the background image. The mobile terminal 100 can optionally display the background image and message content 1622 input by a user in the content field 1617.

Referring to FIG. 16B, the mobile terminal 100 can prepare a message that includes first object related information, second object related information and a background image, such that the object indicators corresponding to the first and second object related information are mapped on the background image.

As shown in FIG. 16B, for example, the mobile terminal 100 can prepare the message 1625 by displaying the counterpart terminals identified as "Jane" and "Tom" in the field 1613 for identifying the intended recipients of the message 1625. The mobile terminal 100 can further display attachment announcement indicators for identifying files attached to the message 1625 in the field 1615, such as the attachment announcement indicator 1601 of the first object related information, the attachment announcement indicator 1602 of the second object related information and an attachment announcement indicator 1604 of the background image 1608.

The object indicators corresponding to the first and second object related information, such as object indicators 301 and 302, can be mapped to the background image 1608 as shown in FIG. 16B. As further shown in FIG. 16B, the mobile terminal 100 can optionally display the background image 1608 and message content 1622 input by a user of the mobile terminal 100 in the content field 1617.

Referring to FIG. 16C, the mobile terminal 100 can prepare a message that includes first object related information and a second object related information.

As shown in FIG. 16C, for example, the mobile terminal 100 can prepare the message 1645 by displaying the counterpart terminals designated as "Jane" and "Tom" in the field 1613 for identifying the intended recipients of the message 1645. The mobile terminal 100 can further display attachment announcement indicators for identifying files attached to the message 1645 in the field 1615, such as the attachment announcement indicator 1601 of the first object related information and the attachment announcement indicator 1602 of the second object related information. The mobile terminal 100 can further display the message content 1622 input by a user of the mobile terminal 100 in the content field 1617.

Referring now to FIG. 13, the mobile terminal 100 can transmit the message prepared in operation S1360 including the specific object related information to each of the selected one or more counterpart terminals (S1370). For example, operation 1370 can be performed using the wireless communication unit 110.

For example, with reference to FIGS. 16A through 16C, the message including the specific object related information can be sent when the transmission zone 1623 labeled "SEND" is selected by the user of the mobile terminal 100.

The specific object related information included in the message sent in operation S1370 can be stored in the memory 160 in response to a selection by the user of the mobile terminal 100 or by a random decision of the controller 180.

The operation of a counterpart terminal (hereinafter referred to as the "receiving terminal") that has received the message including the specific object related information sent by the mobile terminal 100 will now be described. In one embodiment, the receiving terminal includes the same elements as the mobile terminal 100 shown in FIG. 1.

When the receiving terminal receives the message including the specific object related information, the receiving terminal can display a screen (hereinafter referred to as a "received message screen") corresponding to the received message. Exemplary received message screens for displaying an object indicator corresponding to object related information included in a received message are described with reference to FIGS. 17A through 17E.

FIGS. 17A to 17E are exemplary display screens of the display module 151-1 showing an operation of a receiving terminal for displaying an object indicator corresponding to an object related information included in a received message in accordance with various embodiments of the present invention.

For ease of description, the user of the mobile terminal 100 from which the message is received is identified as "Amy" and displayed in the field 1725 for identifying the counterpart terminal that sent the received message. Moreover, the received message 1705 in FIGS. 17A and 17B correspond to the message 1605 in FIG. 16A, the received message 1715 in FIG. 17C corresponds to the message 1625 in FIG. 16B, and the received message 1745 in FIG. 17D corresponds to the message 1645 in FIG. 16C.

Figure 17A:
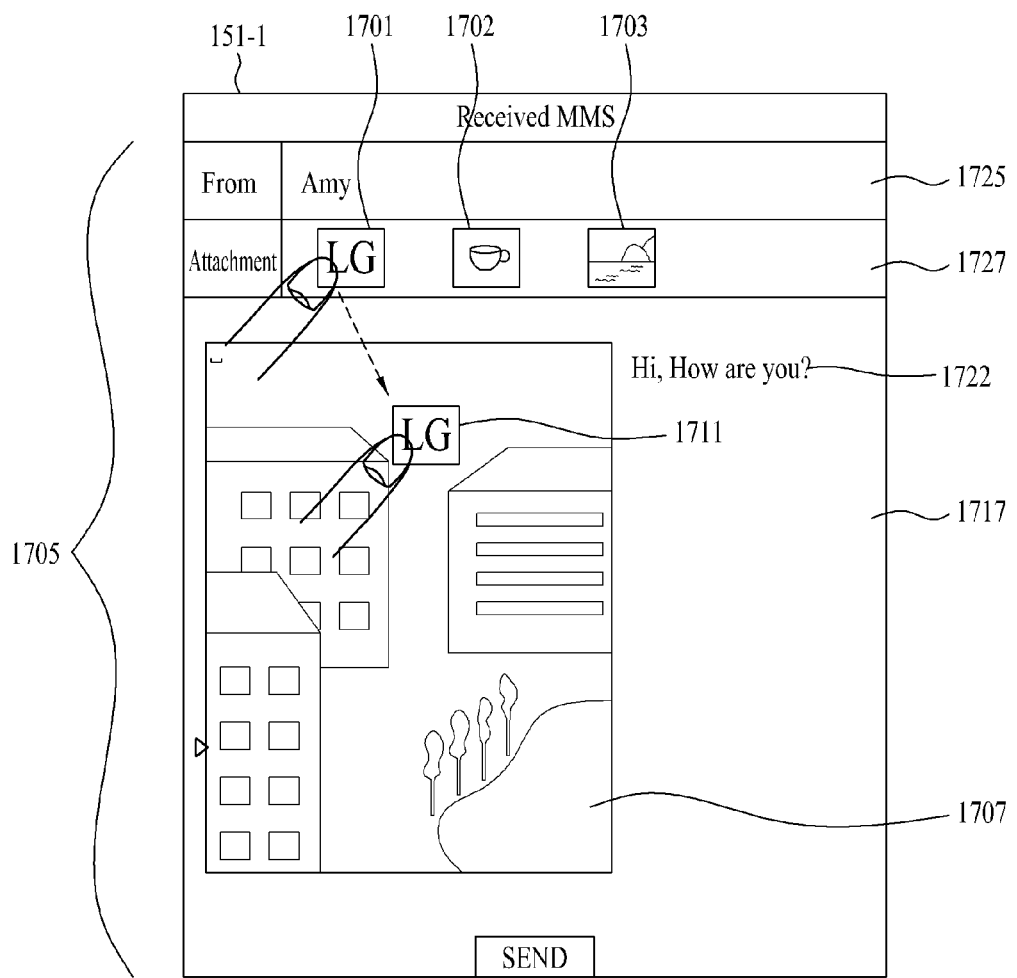
FIGS. 17A to 17E are exemplary display screens of the display module showing an operation of a receiving terminal for displaying an object indicator corresponding to an object related information included in a received message in accordance with various embodiments of the present invention.

Referring to FIG. 17A, when the message 1705 is received, the receiving terminal can display an attachment announcement indicator 1701 of the first object related information, an attachment announcement indicator 1702 of the second object related information and an attachment announcement indicator 1703 of the background image in the field 1727, and can further display the background image 1707 and the message content 1722 input by the user "Amy" in a content field 1717.

When a touch and drag input from the attachment announcement indicator 1701 to a point on the background image 1707 is received from the user of the receiving terminal as shown in FIG. 17A, or when a touch input is received from the user of the receiving terminal on the attachment announcement indicator 1701 followed by a touch input on a point on the background image 1707, the receiving terminal can display an object indicator 1711 corresponding to the attachment announcement indicator 1701 at a point on the background image 1707.

The attachment announcement indicator, such as the attachment announcement indicator 1701, can include an icon of an object corresponding to the attached object related information. The icon can include a name of the corresponding object, a representative image of the corresponding object, or a representative logo of the corresponding object.

Figure 17B:
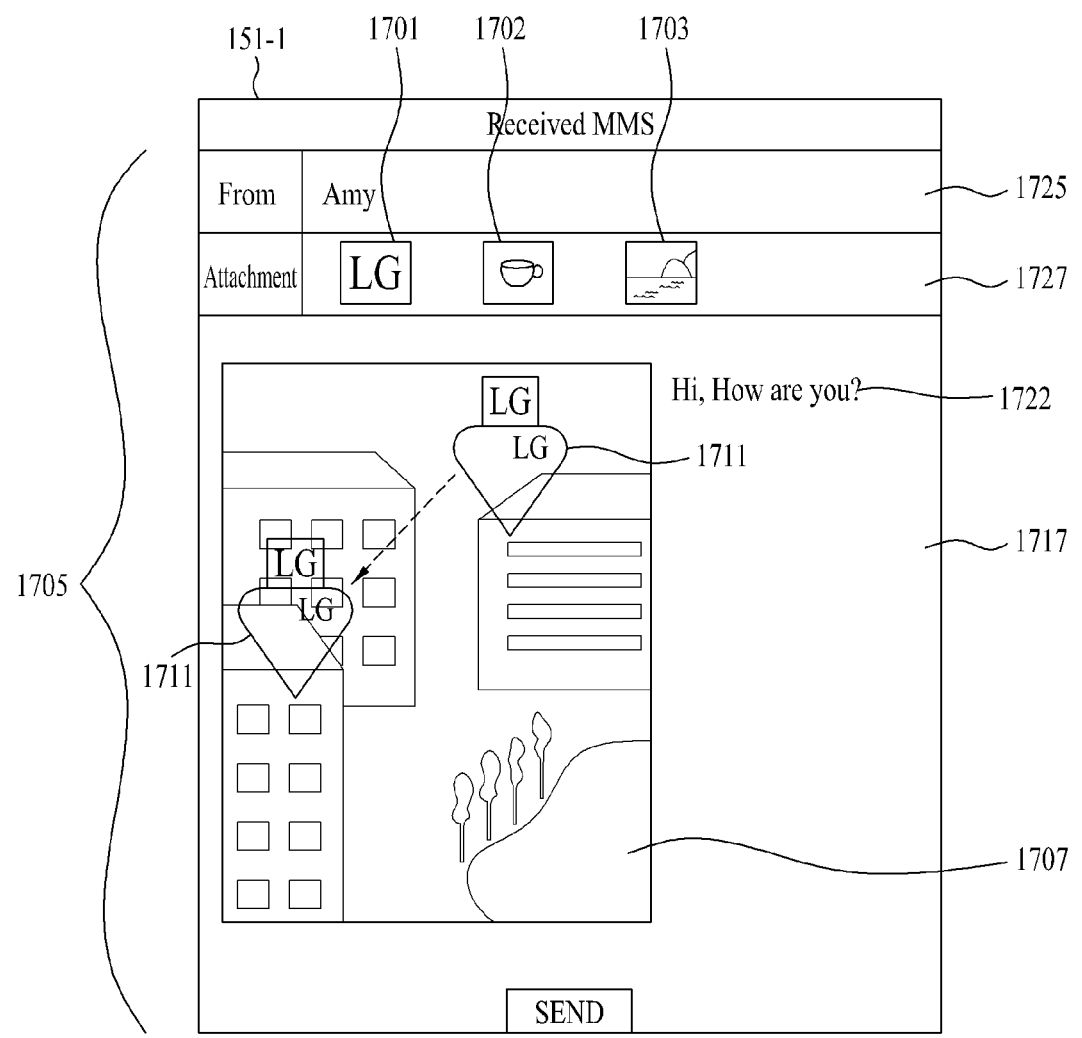

The receiving terminal can move the object indicator 1711 to a point (hereinafter referred to as the "position point") on the background image 1707 representing the approximate position of the object indicated by the object indicator 1711 as shown in FIG. 17B. The receiving terminal can check the position point of the object indicated by the object indicator 1711 on the background image 1707.

Figure 17C:
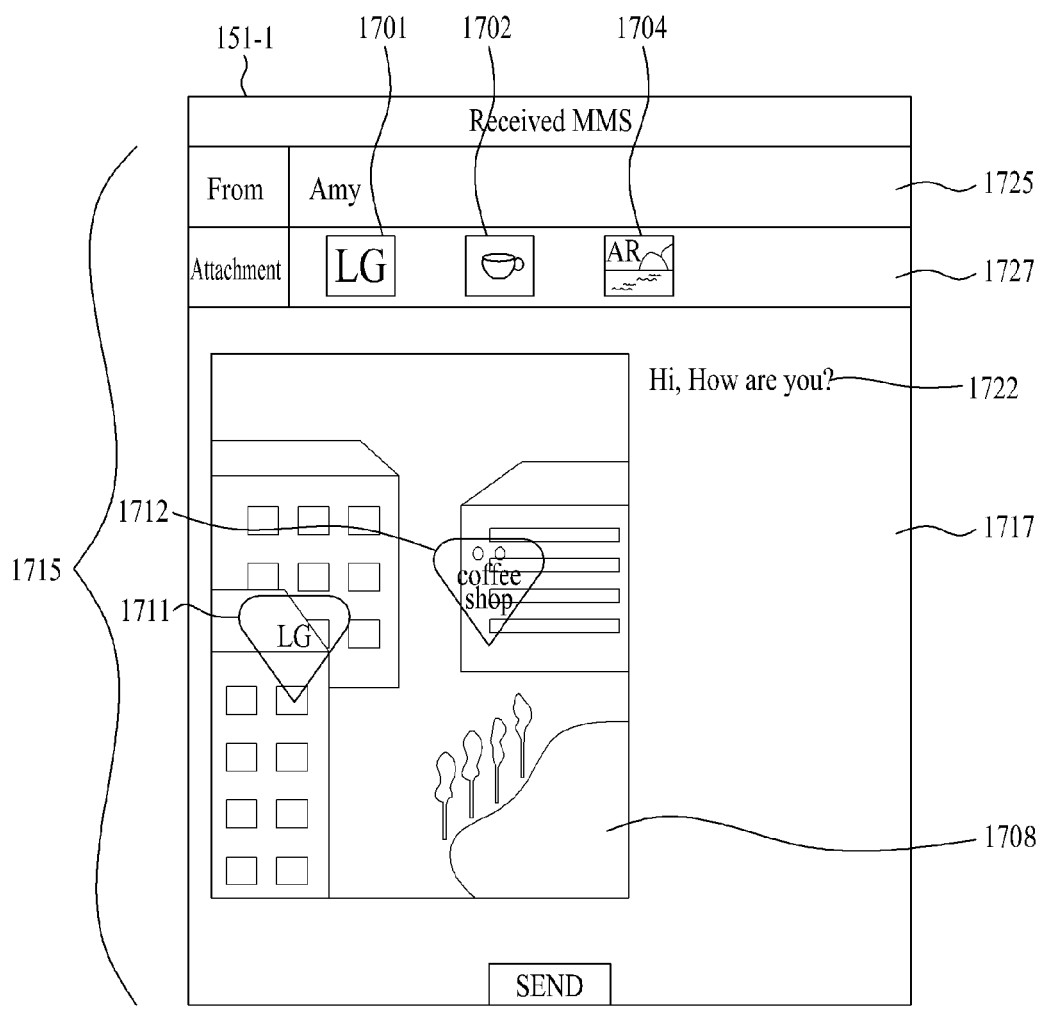

Referring to FIG. 17C, when the message 1715 is received, the receiving terminal can display the attachment announcement indicator 1701 of first object related information, the attachment announcement indicator 1702 of second object related information and an attachment announcement indicator 1704 of the background image 1708 in the field 1727. The receiving terminal can further display the background image 1708 to which first and second object indicators 1711 and 1712 are mapped, and display the message content 1722 input by the user "Amy" in the content field 1717.

Figure 17D:
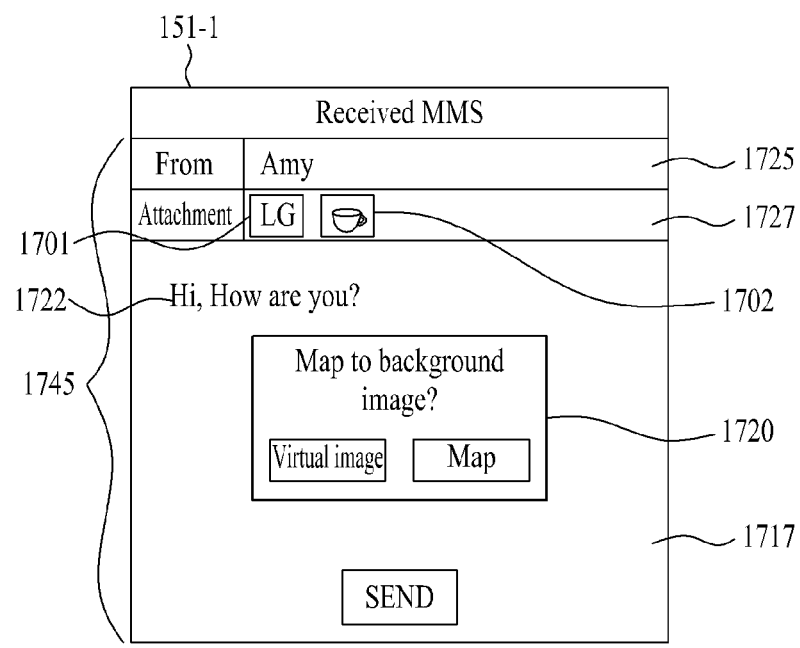

Referring to FIG. 17D, when the message 1745 is received, the receiving terminal can display an attachment announcement indicator 1701 of first object related information and an attachment announcement indicator 1702 of second object related information in the field 1727 and can display message content 1722 input by the user "Amy" in the content field 1717.

The receiving terminal can display a message window 1720 for enabling a user to select a mapping type for each of the first and second object indicators of the attached first and second object related information.

For example, with reference to FIG. 17D, if the "Virtual image" option in the message window 1720 is selected as the mapping type, the receiving terminal can acquire a virtual image of a position where the first and second objects corresponding to first and second object related information are approximately located. For example, the virtual image, such as the virtual image 1729 in FIG. 17E, can be downloaded by the receiving terminal from a server or extracted from a memory, such as the memory 160.

Figure 17E:
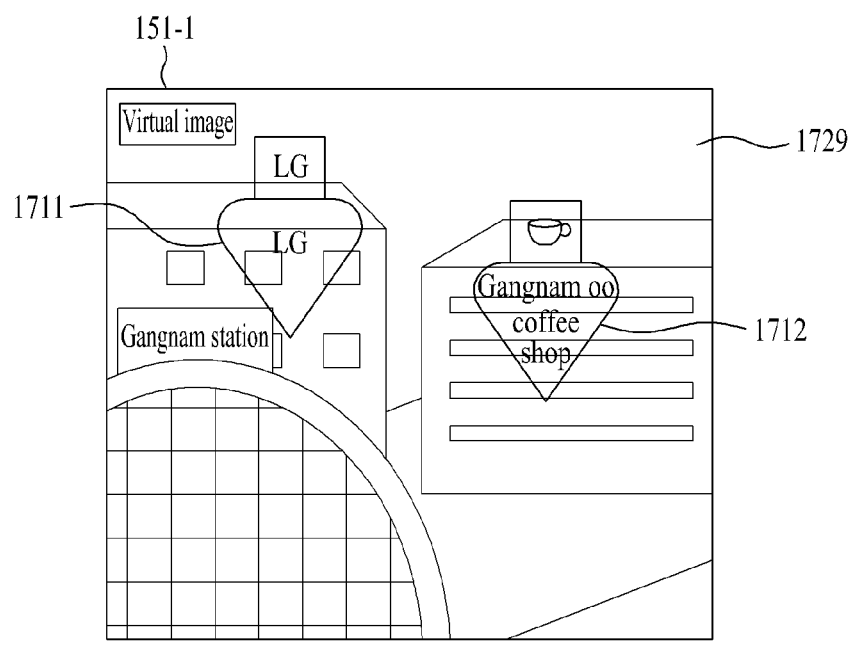

The receiving terminal can display the first and second object indicators 1711 and 1712 at points on the virtual image 1729 where the first and second objects are approximately located, as shown in FIG. 17E. In one embodiment, the receiving terminal can receive the virtual image from the mobile terminal 100 via the received message 1745.

Exemplary received message screens for displaying object related information included in a received message will now be described with reference to FIGS. 18A and 18B. FIGS.

18A and 18B are exemplary display screens of the display module 151-1 showing an operation of a receiving terminal for displaying an object indicator corresponding to object related information included in a received message in accordance with various embodiments of the present invention.

Figure 18A:
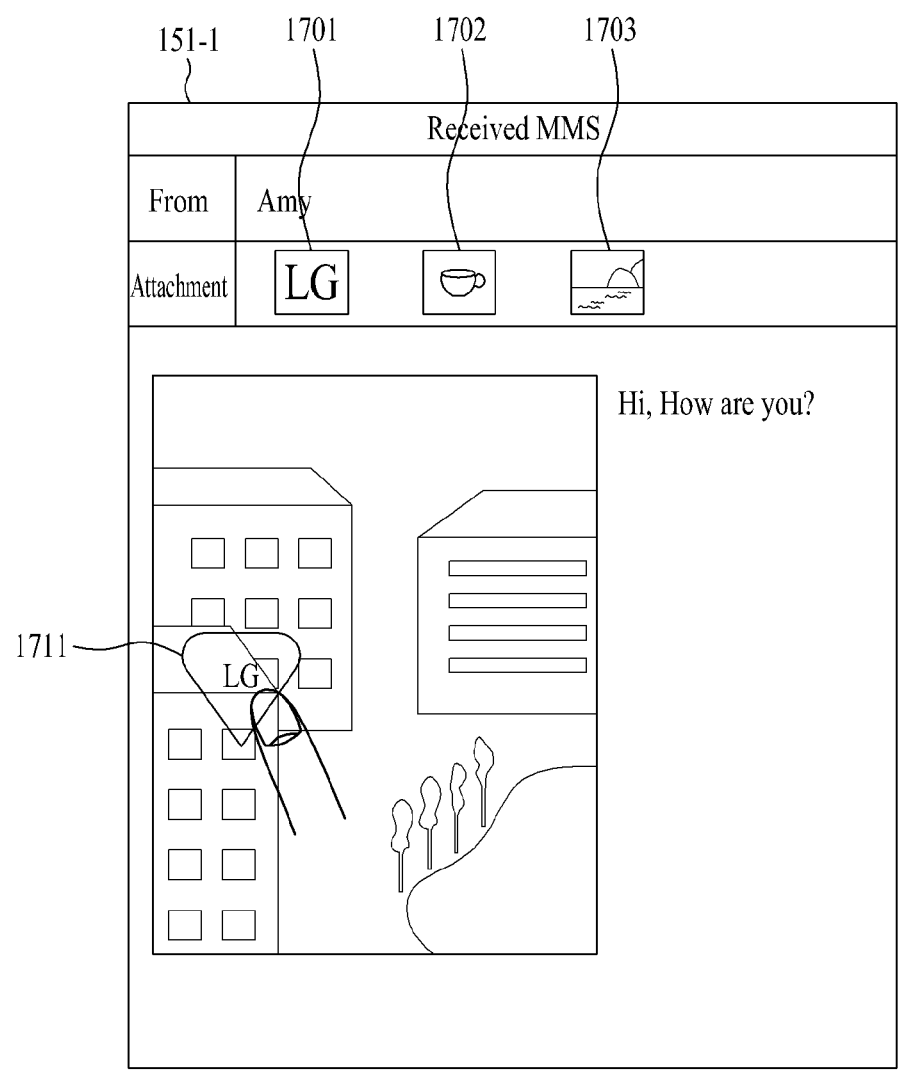
FIGS. 18A and 18B are exemplary display screens of the display module showing an operation of a receiving terminal for displaying an object indicator corresponding to object related information included in a received message in accordance with various embodiments of the present invention.

Referring to FIG. 18A, the receiving terminal can receive a selection input from a user of the receiving terminal on an object indicator mapped to the background image, such as the object indicator 1711 in FIG. 18A. For example, the selection input can include a command for providing the object related information corresponding to the object indicator 1711.

Figure 18B:
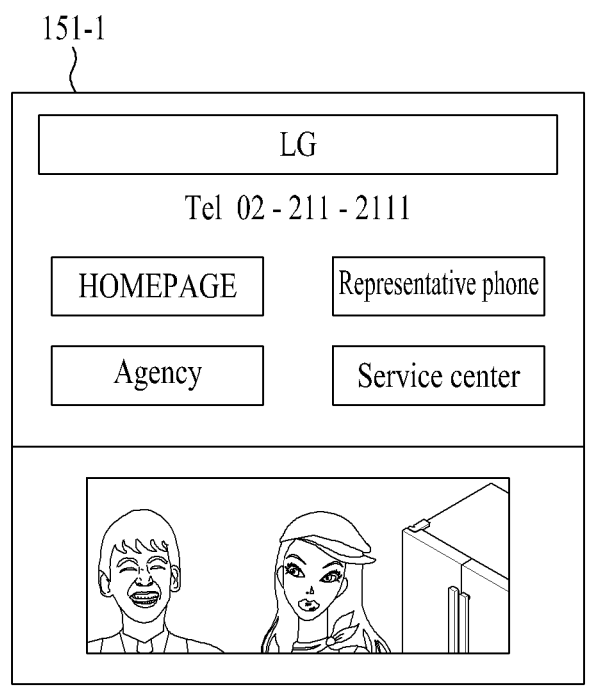

Referring to FIG. 18B, the receiving terminal can output the object related information corresponding to the object indicator 1711 selected by the user of the receiving terminal. The receiving terminal can extract and output the object related information corresponding to the object indicator 1711 among the object related information included in the received message.

Alternatively, the receiving terminal can access a Web site using the Web address information, such as a URL address, in the object related information corresponding to the object indicator 1711 included in the received message. The receiving terminal can then output the object related information provided by the Web site. Moreover, the object related information can be output in various forms, such as text, audio, or an image.

In one embodiment, the receiving terminal can output object related information corresponding to the object indicator 1711 by selecting the attachment announcement indicator 1701.

Therefore, as previously described, a receiving terminal can output an object indicator or object related information included in a message received from the mobile terminal 100. It should be understood that the mobile terminal 100 can receive a message including object related information from a counterpart terminal using the wireless communication unit 110 and provide the object related information included in the received message or an object indicator corresponding to the object related information to a user in a similar manner as previously described with respect to the receiving terminal.

A process for displaying a list of messages transmitted and/or received by the mobile terminal 100 and which can include object related information will now be described. For example, the mobile terminal 100 can display the list of messages using the display module 151 and identifiably display whether object related information is included in each of the transmitted or received messages.

In one embodiment, the mobile terminal 100 can display a list of messages transmitted and/or received by the mobile terminal 100 and that include object related information, such that the list of messages are arranged according to a prescribed reference. For example, the prescribed reference can be a type of object corresponding to the object related information, an object position or place, or a distance from the current position of the mobile terminal 100.

A process for displaying a list of messages transmitted and/or received by the mobile terminal 100 will now be explained with reference to FIGS. 19A through 19D. FIGS. 19A through 19D are exemplary display screens of the display module 151 showing an operation of the mobile terminal 100 for displaying a list of transmitted and/or received messages that include object related information in accordance with various embodiments of the present invention.

Figure 19A:
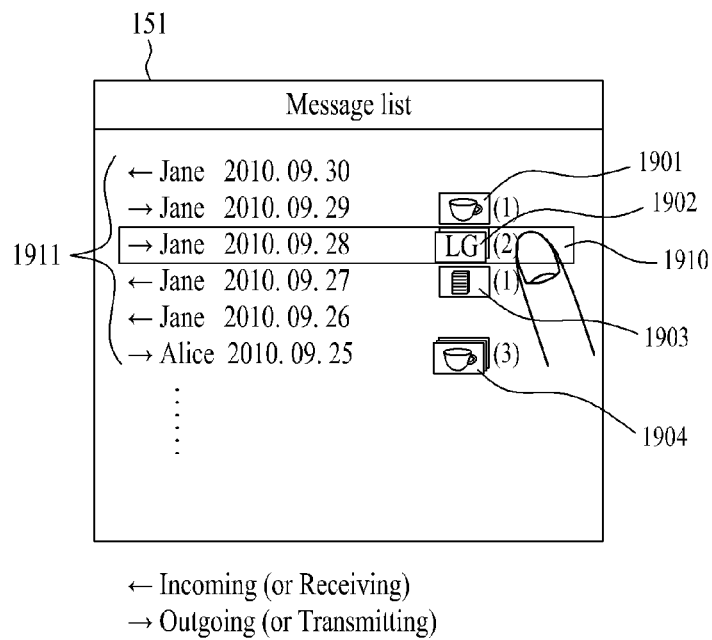
FIGS. 19A through 19D are exemplary display screens of the display module showing an operation of the mobile terminal for displaying a list of transmitted and/or received messages that include object related information in accordance with various embodiments of the present invention.

Referring to FIG. 19A, the mobile terminal 100 can display the message list 1911 that includes a number of messages previously transmitted and/or received by the mobile terminal 100. In the embodiment of FIG. 19A, the message list 1911 is arranged according to a time at which each corresponding message was transmitted or received.

As shown in FIG. 19A, when object related information is included in a message of the message list 1911, a representative icon or image of the object related information, such as icons 1901, 1902, 1903 or 1904, and the number of objects corresponding to the included object related information, such as the numbers enclosed in parentheses in FIG. 19A, can be displayed with the message list 1911.

For example, each message included in the message list 1911 can be displayed with reference to a name or a phone number of a counterpart terminal to which messages were transmitted or from which the messages were received, and a time at which the messages were transmitted or received.

For example, with reference to FIG. 19A, if the message 1910 sent to "Jane" on "2010. 09. 28" is selected from the message list 1911, the mobile terminal 100 can display the content of the selected message 1910 and an attachment announcement indicator of the object related information included in the selected message 1910 in a field for indicating attached files. In addition, the mobile terminal 100 can display a background image to which the object related information included in the selected message 1910 or an object indicator of the object related information is mapped.

Figure 19B:
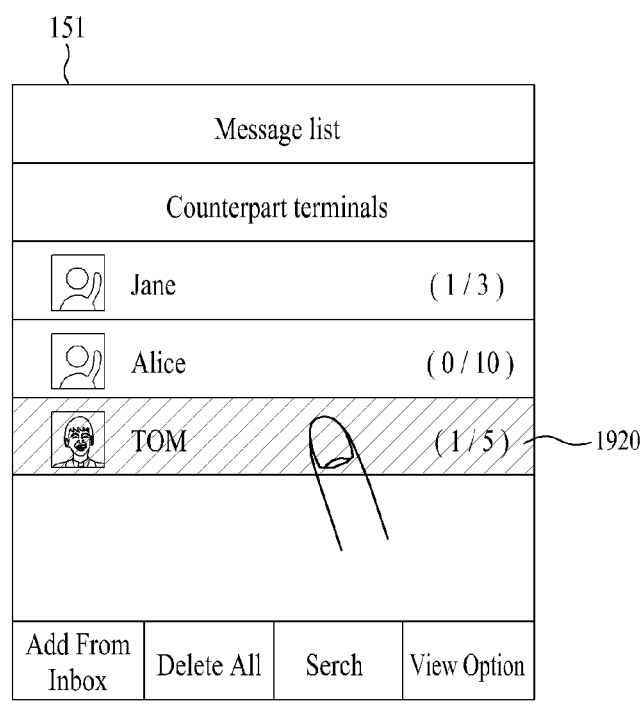

Referring to FIG. 19B, the mobile terminal 100 can display a list of counterpart terminals from which a message has been received or to which a message was transmitted. In one embodiment, the list of counterpart terminals can include only counterpart terminals from which the message received includes object related information and counterpart terminals to which the message transmitted includes object related information.

As shown in FIG. 19B, a total number of messages corresponding to each counterpart terminal, and the number of unchecked messages from each corresponding counterpart terminal can be displayed by the mobile terminal 100. For example, the counterpart terminal indicated as "Jane (1/3)" shown in FIG. 19B indicates that one of a total of three messages with respect to that counterpart terminal has not been checked.

Figure 19C:
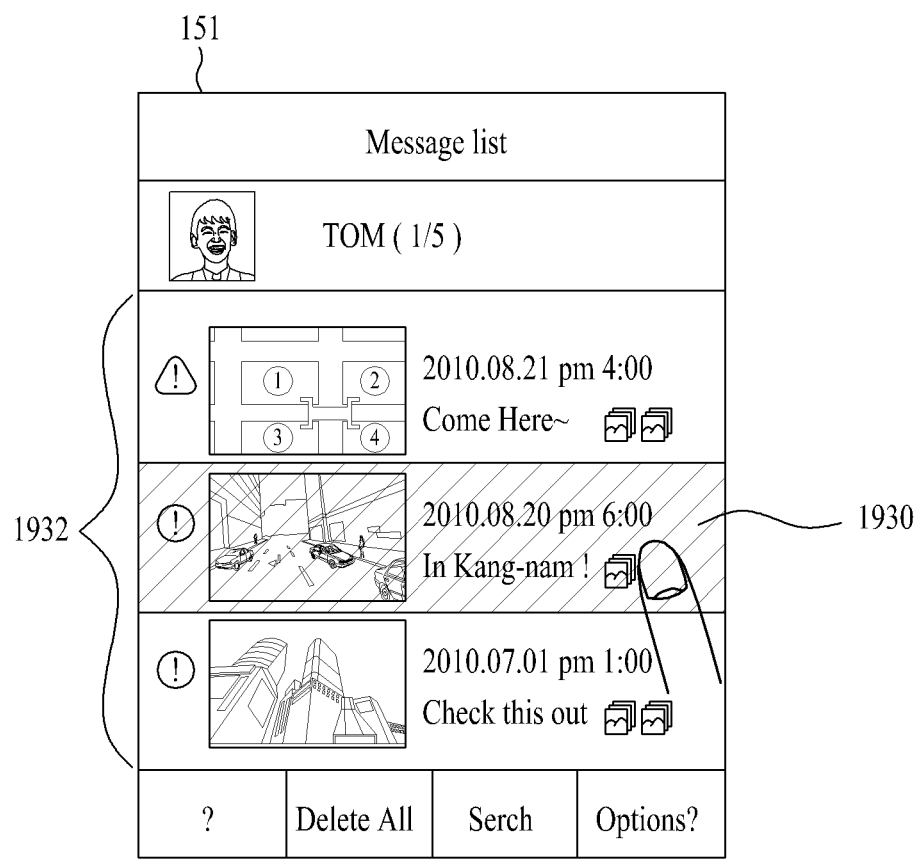

With reference to FIG. 19C, if the counterpart terminal identified as "Tom" 1920 in FIG. 19B is selected, the mobile terminal 100 can display a message list 1932 including messages transmitted to, or received from, the counterpart terminal identified as "Tom."

For example, if any of the messages communicated with "Tom" includes object related information, a corresponding background image and a representative image or icon of an object corresponding to the included object related information can displayed together.

Figure 19D:
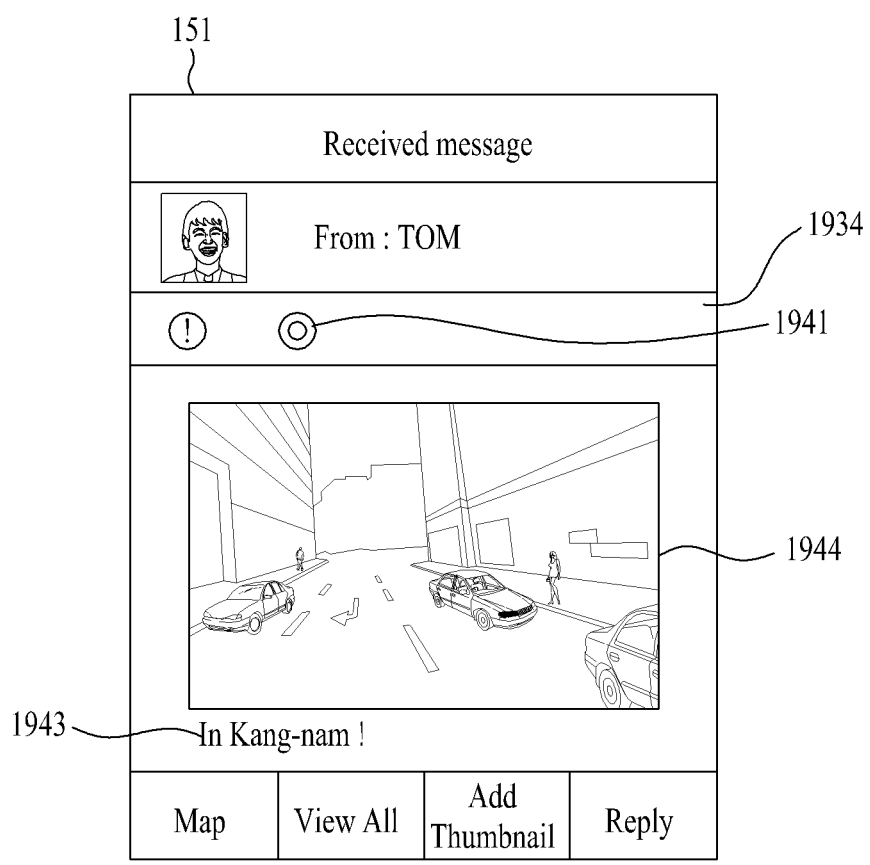

If a received message selected from the messages list 1932, such as message 1930, includes object related information, the mobile terminal 100 can display the content 1943 of the message and a corresponding background image 1944 as shown in FIG. 19D. The mobile terminal 100 can further display an attachment announcement indicator 1941 in a field 1934 for indicating that the object related information is attached.

As previously discussed with respect to FIGS. 17A to 17E, if an object indicator corresponding to the attachment announcement indicator 1941 is mapped to the corresponding background image, the mobile terminal 100 can display the object indicator and the corresponding background image.

According to one embodiment of the present invention, the above-described object related information managing method can be implemented in a program recorded medium as computer-readable codes. The computer-readable media can include various types of recording devices in which data readable by a computer system are stored. For example, the computer-readable media can include ROM, RAM, CD-ROM, magnetic tapes, floppy discs, and optical data storage devices, and can also include carrier-wave type implementations (e.g., transmission via Internet). The controller 180 of the mobile terminal 100 can perform the functions of a computer.

Accordingly, various implementations permit the following effects and features.

Some examples enable storage of object related information corresponding to an object indicator displayed on a background image, thereby providing a user with the stored object related information or the object indicator corresponding to the object related information at any time without operating an augmented reality program.

Other implementations provide a counterpart terminal with object related information corresponding to an object indicator displayed on a background image, thereby enabling the counterpart terminal to provide a user with a background image to which the object related information or an object indicator of the object related information is mapped. As such, the present invention enables counterpart terminals that are not equipped with AR capabilities to simulate the features of AR.

It will be apparent to those skilled in the art that various modifications and variations can be made in the present invention without departing from the spirit or scope of the invention. Thus, it is intended that the present invention covers the modifications and variations of this invention provided they are within the scope of the appended claims and their equivalents.

What is claimed is:

1. A mobile terminal, comprising:
a wireless communication unit configured to receive position information of the mobile terminal and object related information of at least one object corresponding to the position information;
a display module configured to display at least one object indicator indicating the at least one object on a background image corresponding to the position information and to display a storage target object indicator region on the background image;
a user input unit configured to receive a selection of an object indicator of the displayed at least one object indicator;
a memory configured to store object related information of the selected object indicator from the received object related information; and
a controller configured to:
control the display module to display an identifier corresponding to the selected object indicator within the storage target object indicator region;
control the display module to display a first list including at least one district name of at least one object included in the stored object related information, wherein the at least one district name indicates a real district location of the at least one object included in the stored object related information;
when at least one district name is selected from the first list, search the stored object related information for at least one item of object related information of at least one object located in a district corresponding to the selected district name;
control the display module to display a second list including the searched at least one item;
control the display module to display a third list including at least one storage time information of at least one item included in the stored object related information;
when at least one storage time information is selected from the third list, search the stored object related information for at least one item stored at a time corresponding to the selected storage time information; and
control the display module to display a fourth list including the searched at least one item.

2. The mobile terminal of claim 1, wherein the received object related information comprises at least a representative image, name, position information, phone number information, Web site address information, or evaluation information of a corresponding one of the at least one object.

3. The mobile terminal of claim 1, wherein the memory is further configured to store at least the position information of the mobile terminal, time information, or the background image at a time when the object related information of the selected object indicator is stored.

4. The mobile terminal of claim 1, wherein the controller is further configured to control the display module to display at least one object image corresponding to the at least one item, such that each of the at least one object image is displayed as a thumbnail image on the second list.

5. The mobile terminal of claim 1, wherein the controller is further configured to arrange the at least one item in the second list according to a priority.

6. The mobile terminal of claim 1, wherein the second list further includes at least one item of object related information corresponding to the position information of the mobile terminal or position information designated by a user.

7. The mobile terminal of claim 1, wherein:
the user input unit is configured to receive a selection input for selecting a specific item in the second list; and
the controller is further configured to control the display module to display the object indicator corresponding to the specific item at a point corresponding to the object represented by the specific item on the background image.

8. The mobile terminal of claim 7, wherein the controller is configured to set the background image to a map image when the object represented by the specific item is located beyond a predetermined distance from the mobile terminal.

9. The mobile terminal of claim 7, wherein the controller is further configured to set a predetermined distance for displaying the at least one object indicator, such that the predetermined distance is a distance from the mobile terminal to the object indicated by the specific item, and control the display module to display the at least one object indicator of the at least one object situated within the predetermined distance from the mobile terminal.

10. The mobile terminal of claim 1, wherein the controller is further configured to update the stored object related information with reference to the received object related information.

11. The mobile terminal of claim 1, wherein the wireless communication unit is further configured to transmit the stored object related information to at least one counterpart terminal.

12. A method for managing object related information in a mobile terminal, the method comprising:
receiving, at a wireless communication unit of the mobile terminal, position information of the mobile terminal and object related information of at least one object corresponding to the position information;

displaying, on a display module of the mobile terminal, at least one object indicator indicating the at least one object on a background image corresponding to the position information and displaying a storage target object indicator region on the background image;

receiving, at a user input unit of the mobile terminal, a selection of an object indicator from the displayed at least one object indicator;

displaying, on the display module, an identifier corresponding to the selected object indicator within the storage target object indicator region;

storing, in a memory of the mobile terminal, object related information of the object represented by the selected object indicator;

displaying, on the display module, a first list including at least one district name of at least one object included in the stored object related information, wherein the at least one district name indicates a real district location of the at least one object included in the stored object related information;

when at least one district name is selected from the first list, searching the stored object related information for at least one item of object related information of at least one object located in a district corresponding to the selected district name;

displaying, on the display module, a second list including the searched at least one item displaying, on the display module, a third list including at least one storage time information of at least one item included in the stored object related information;

when at least one storage time information is selected from the third list, searching the stored object related information for at least one item stored at a time corresponding to the selected storage time information; and displaying, on the display module, a fourth list including the searched at least one item.

13. The method of claim 12, wherein displaying the second list comprises displaying at least one item of object related information corresponding to the position information of the mobile terminal or position information designated by a user.

14. The method of claim 12, further comprising:

when a specific item is selected from the second list, displaying, on the display module, the object indicator corresponding to the specific item at a point corresponding to the object represented by the specific item on the background image.

* * * * *